Feb. 20, 1923.

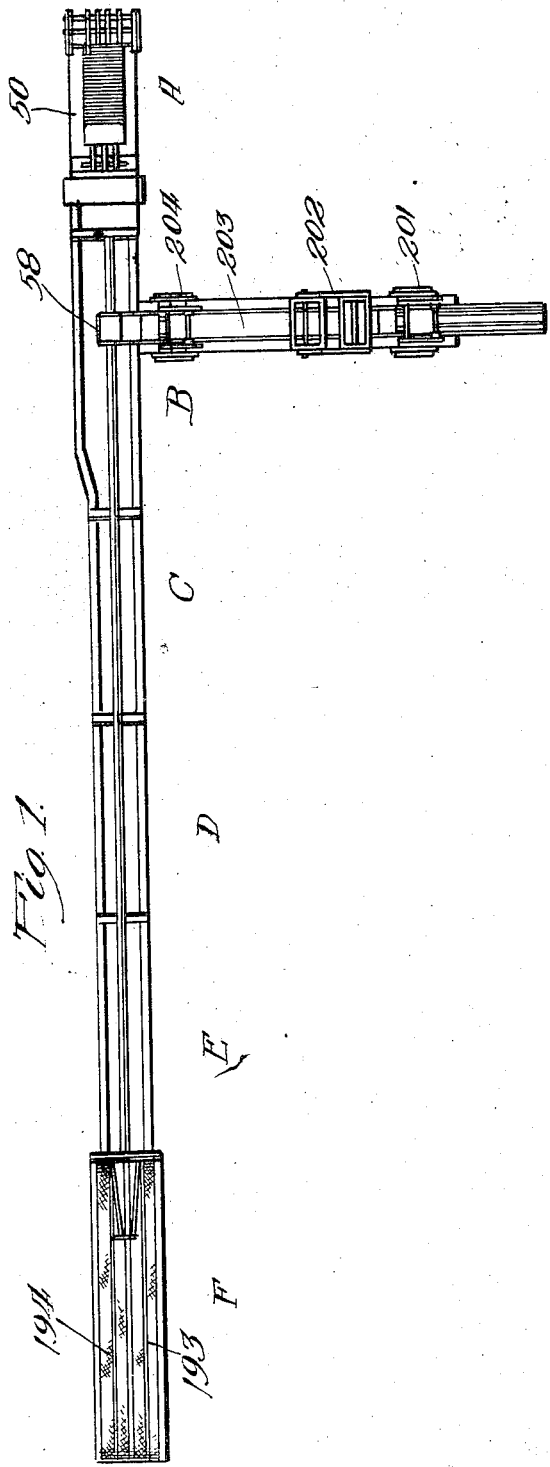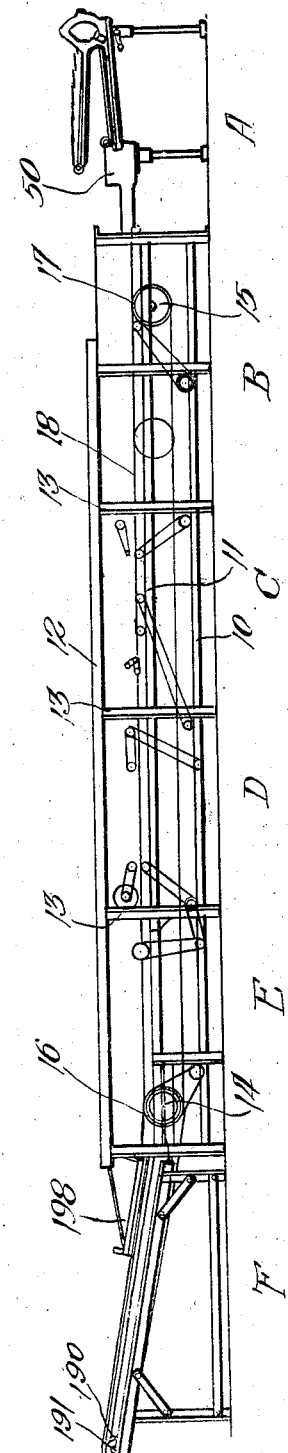

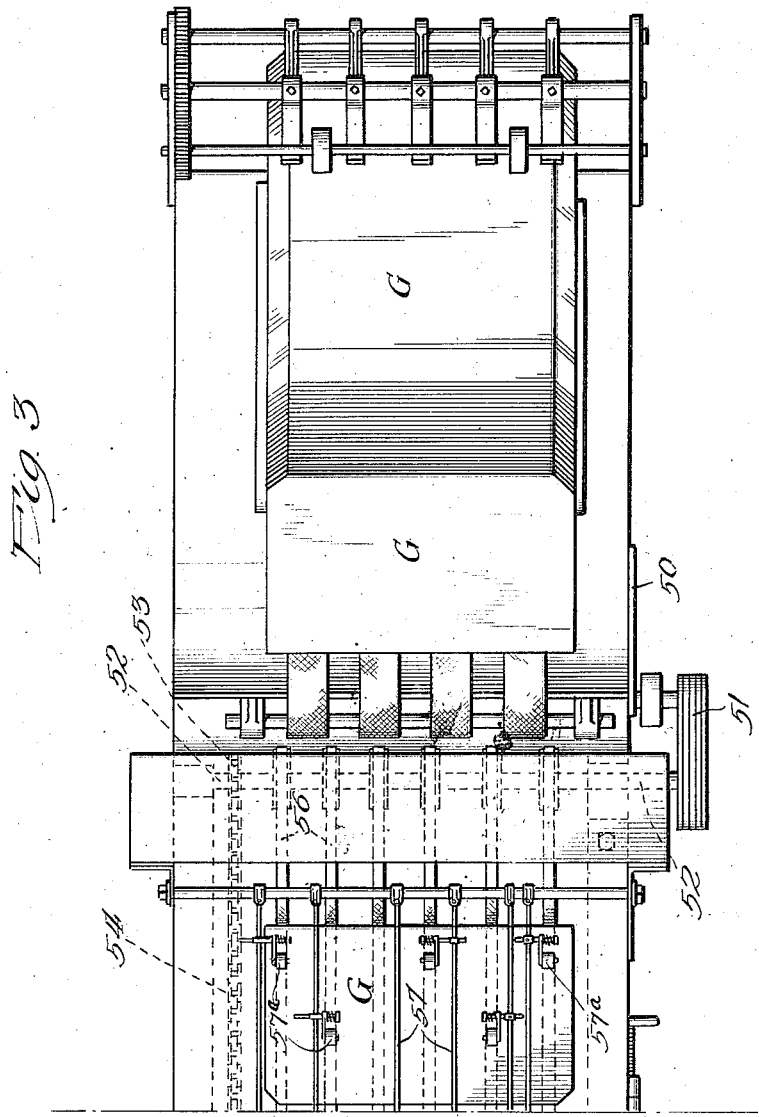

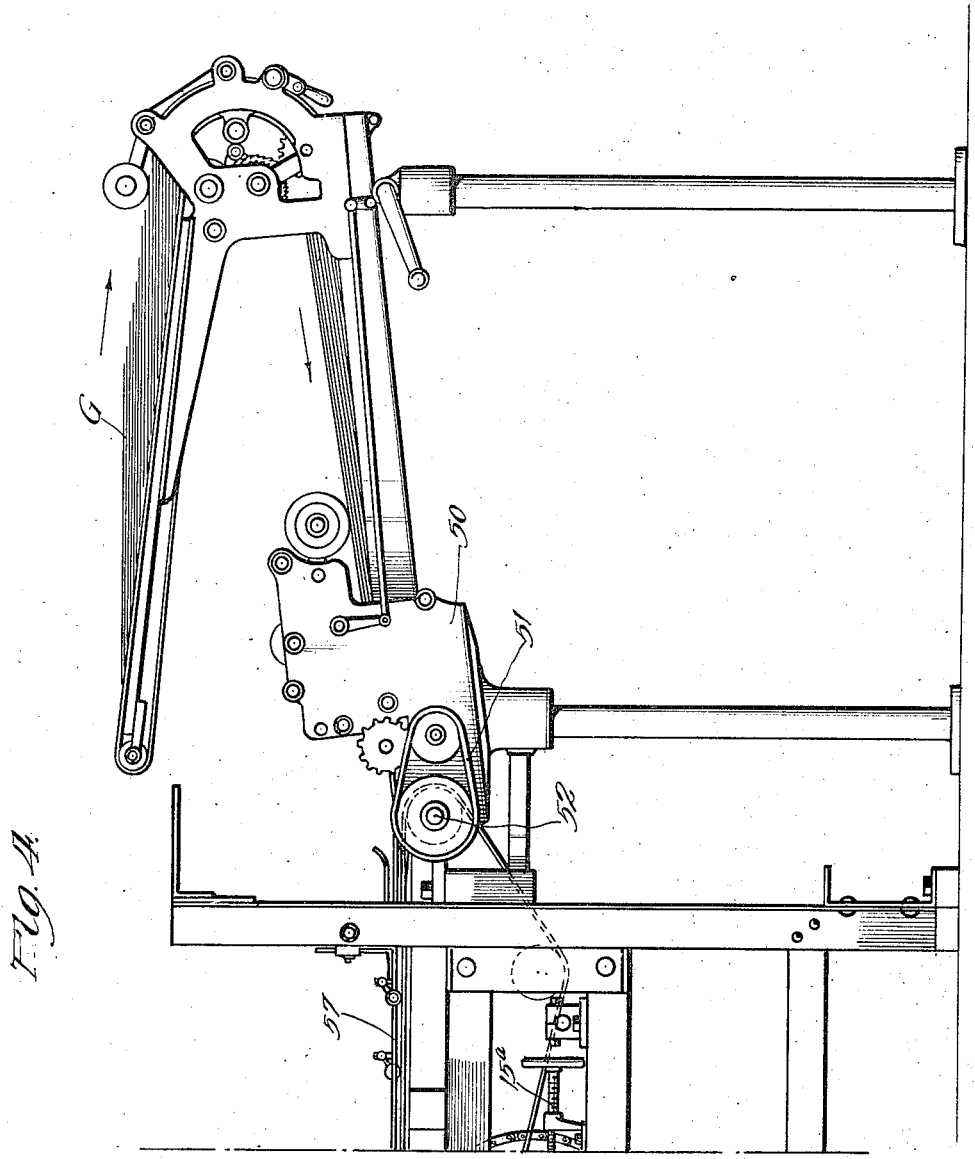

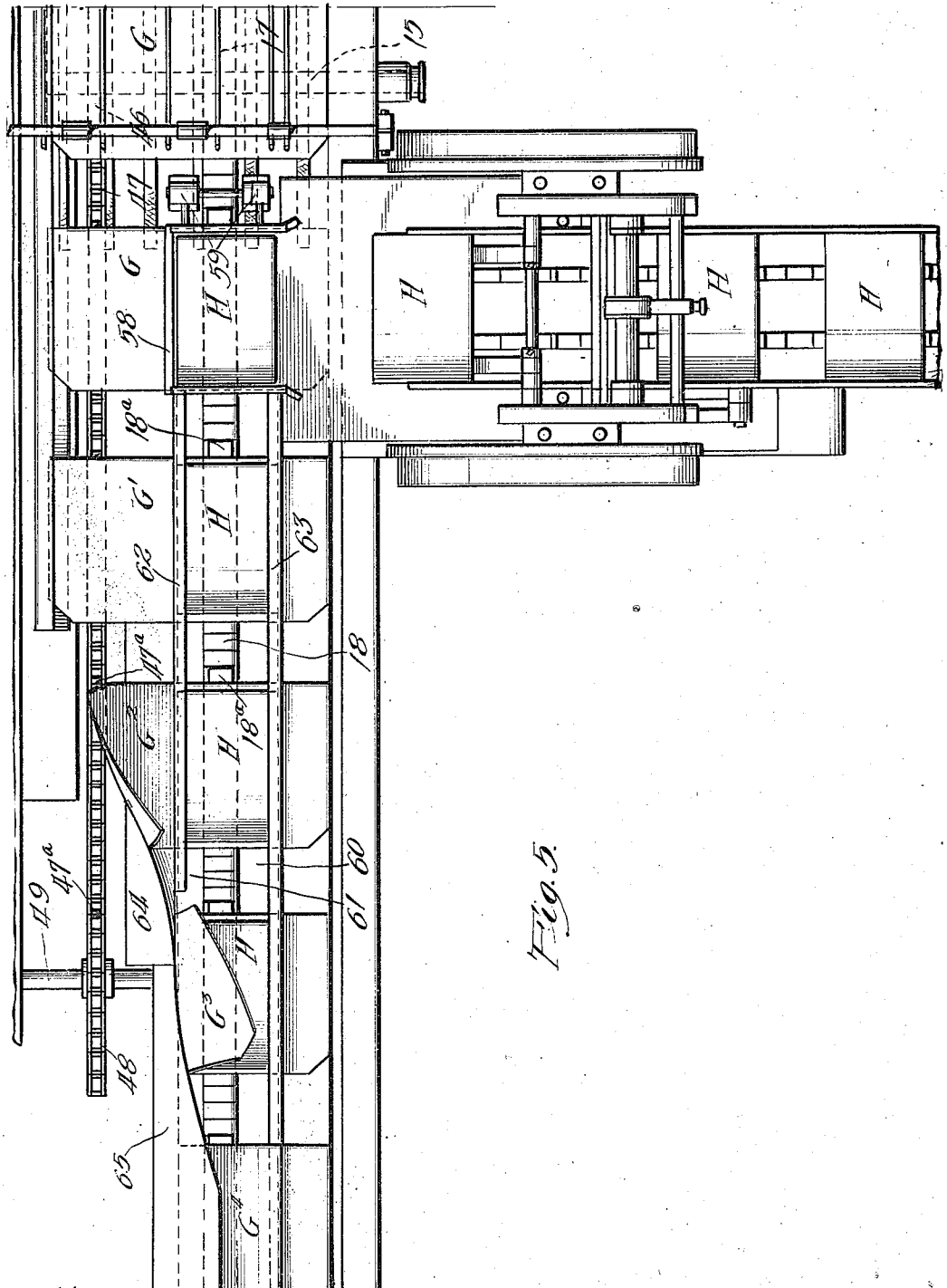

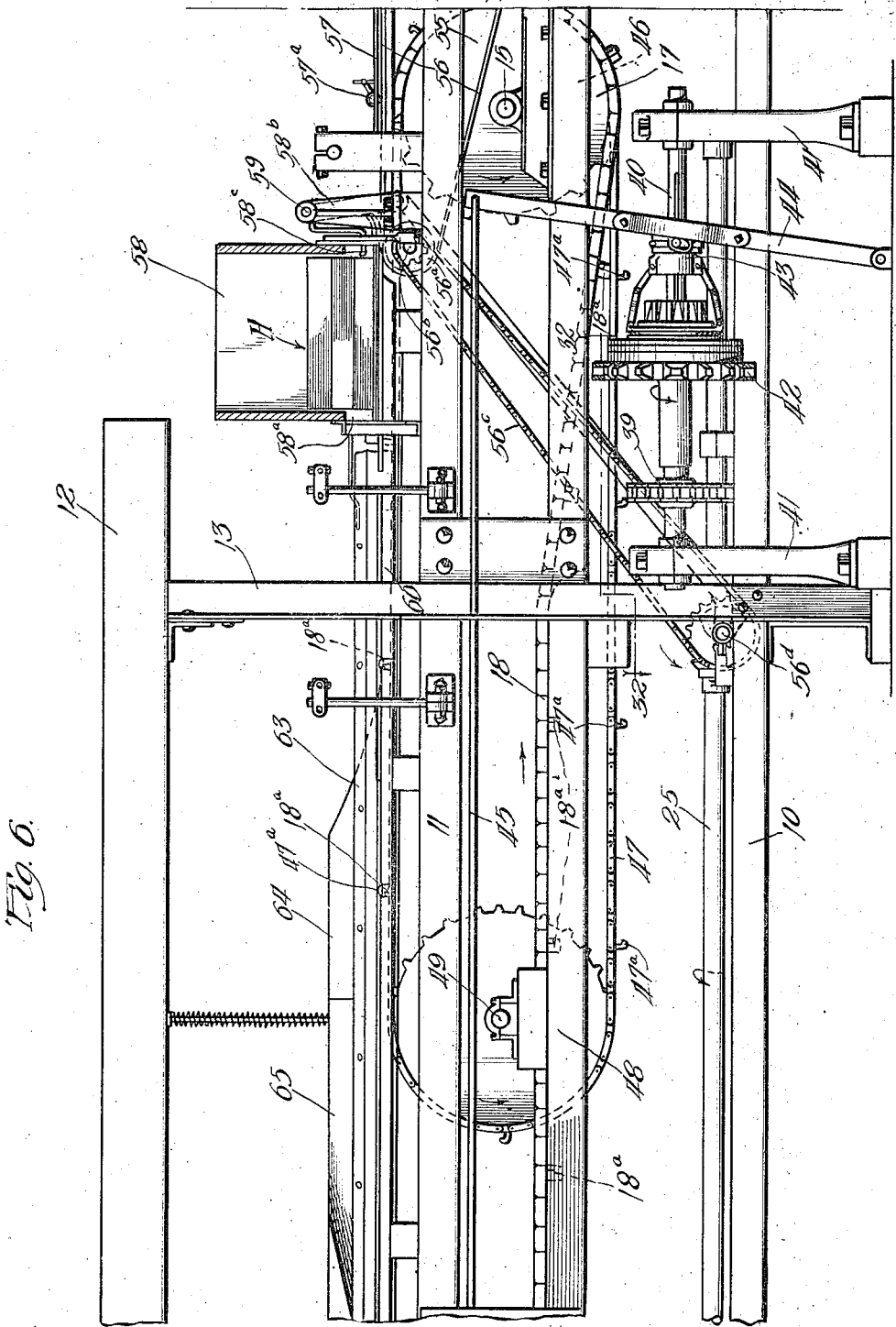

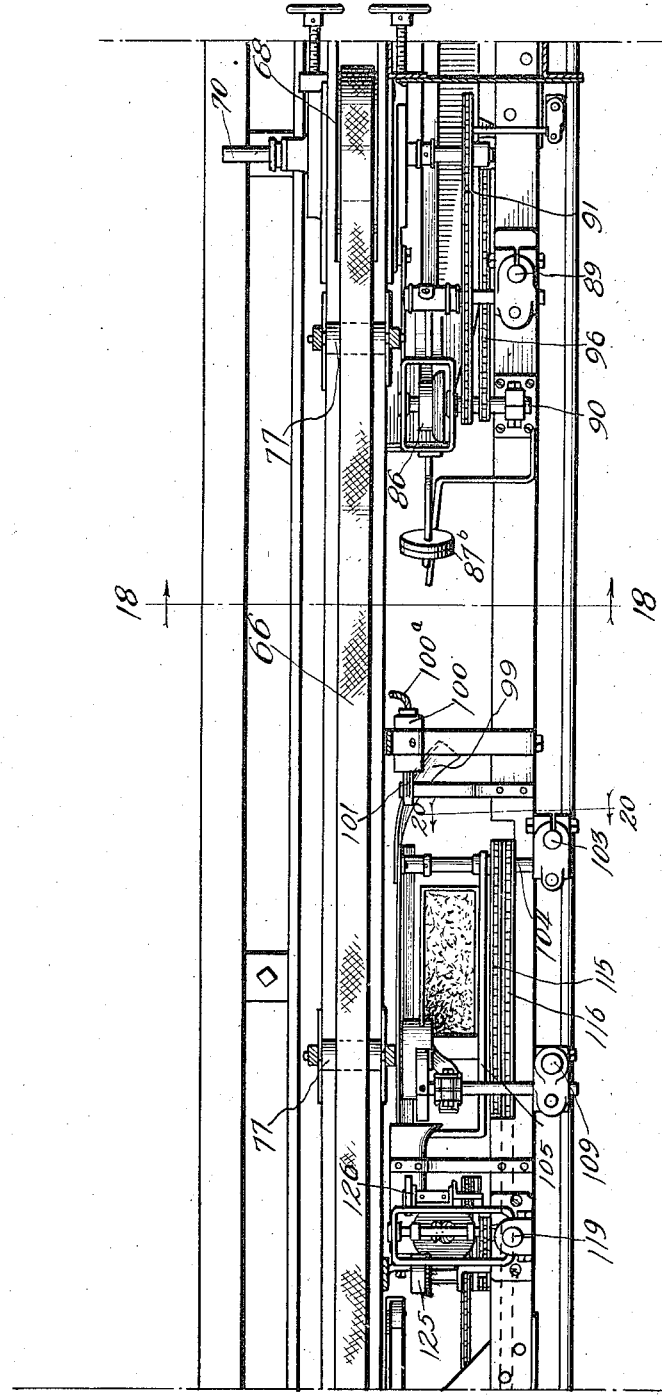

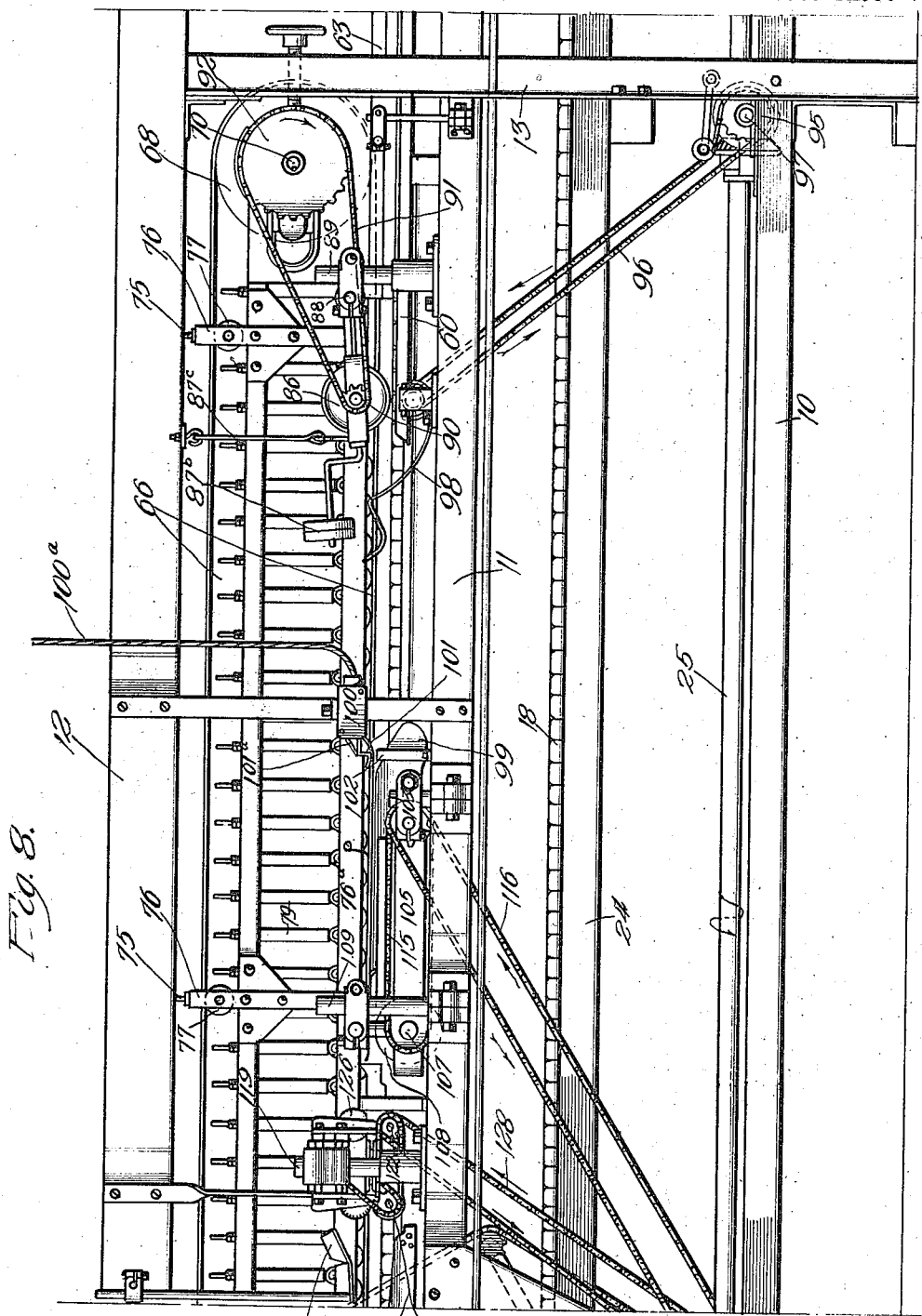

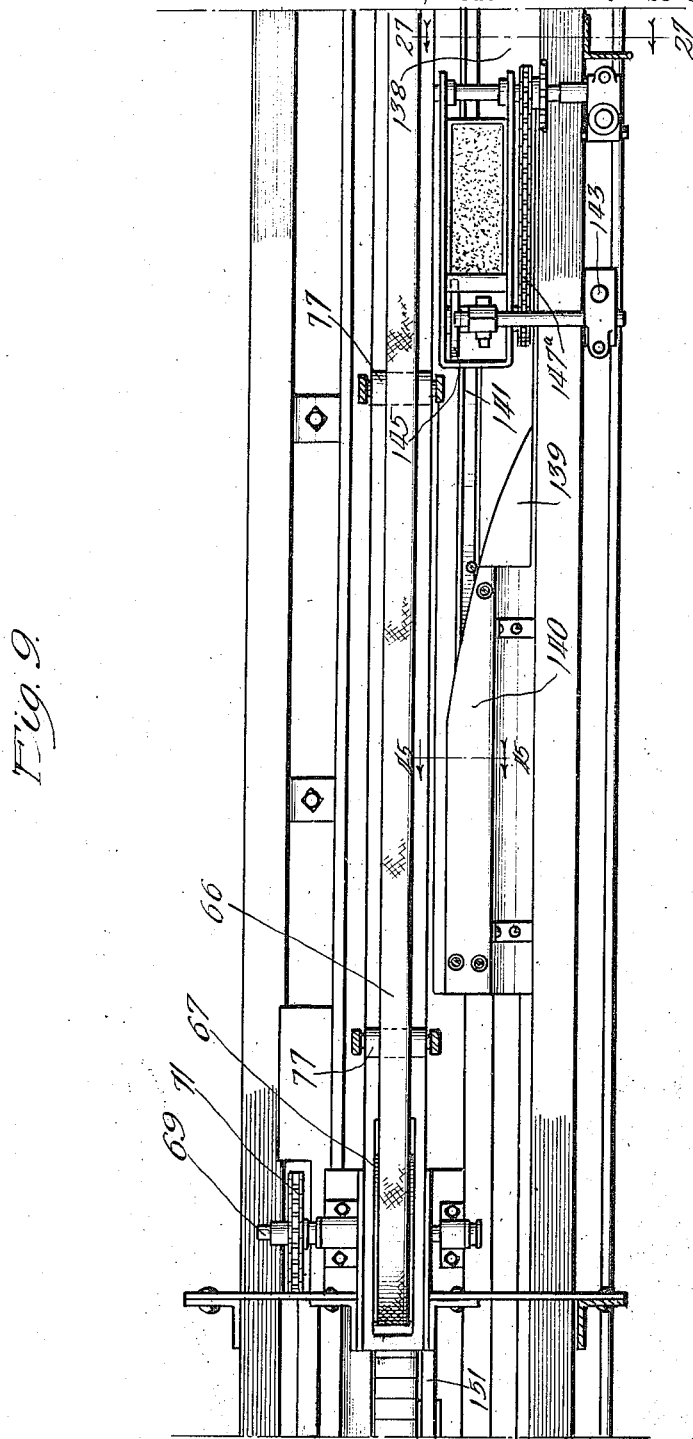

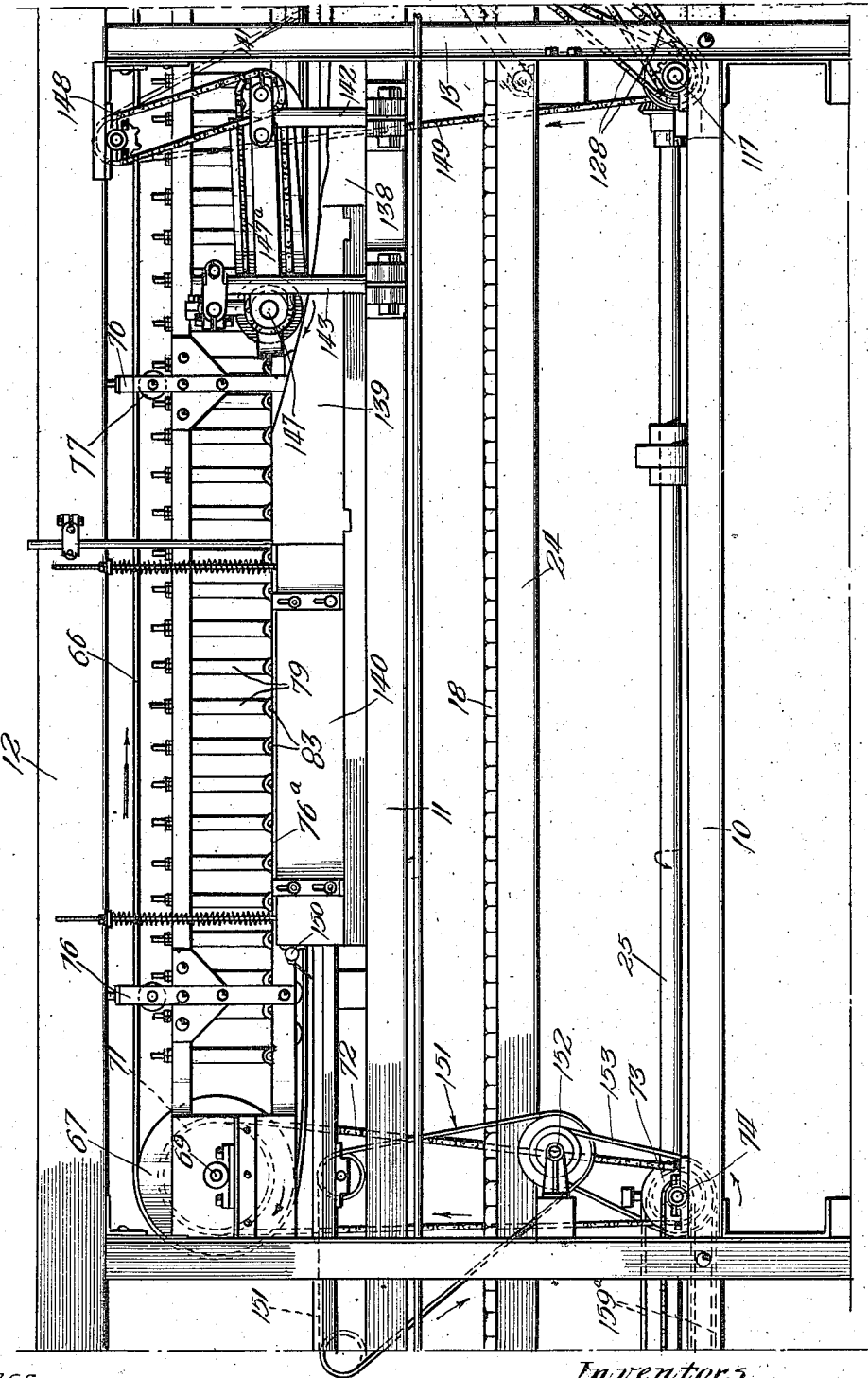

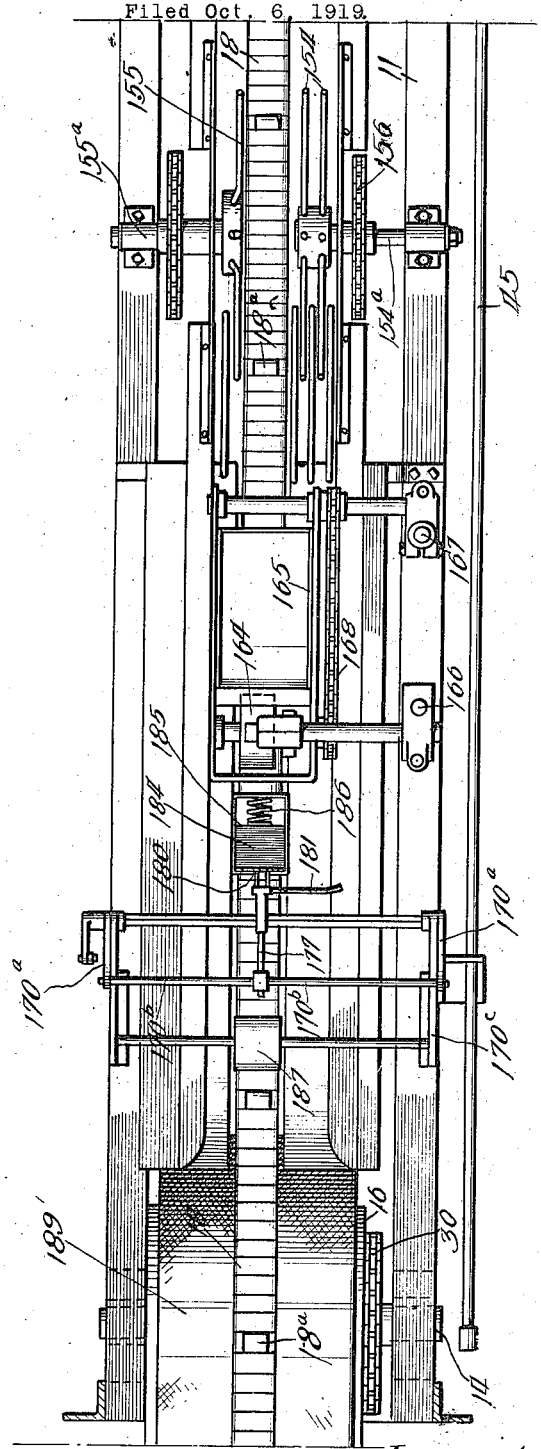

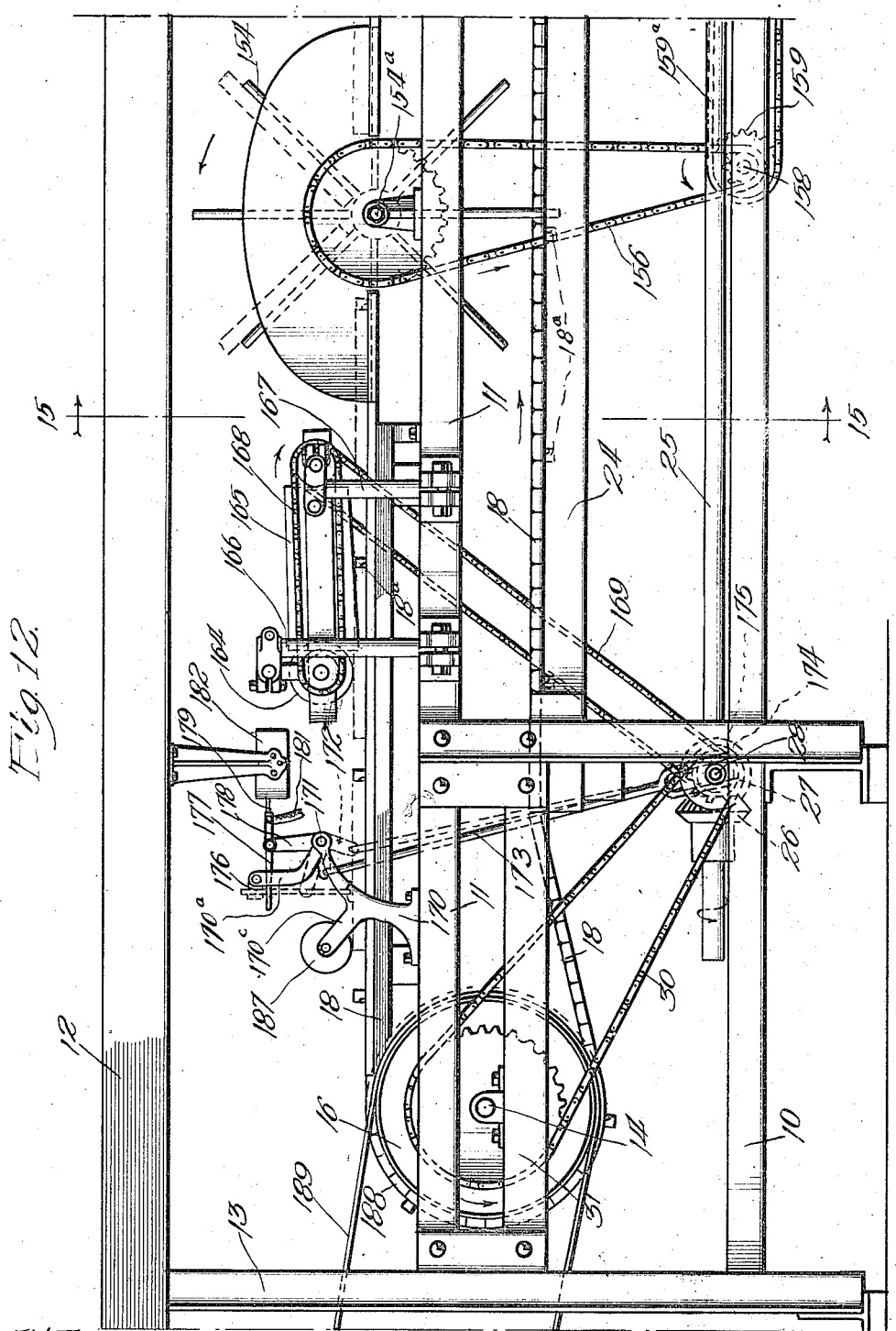

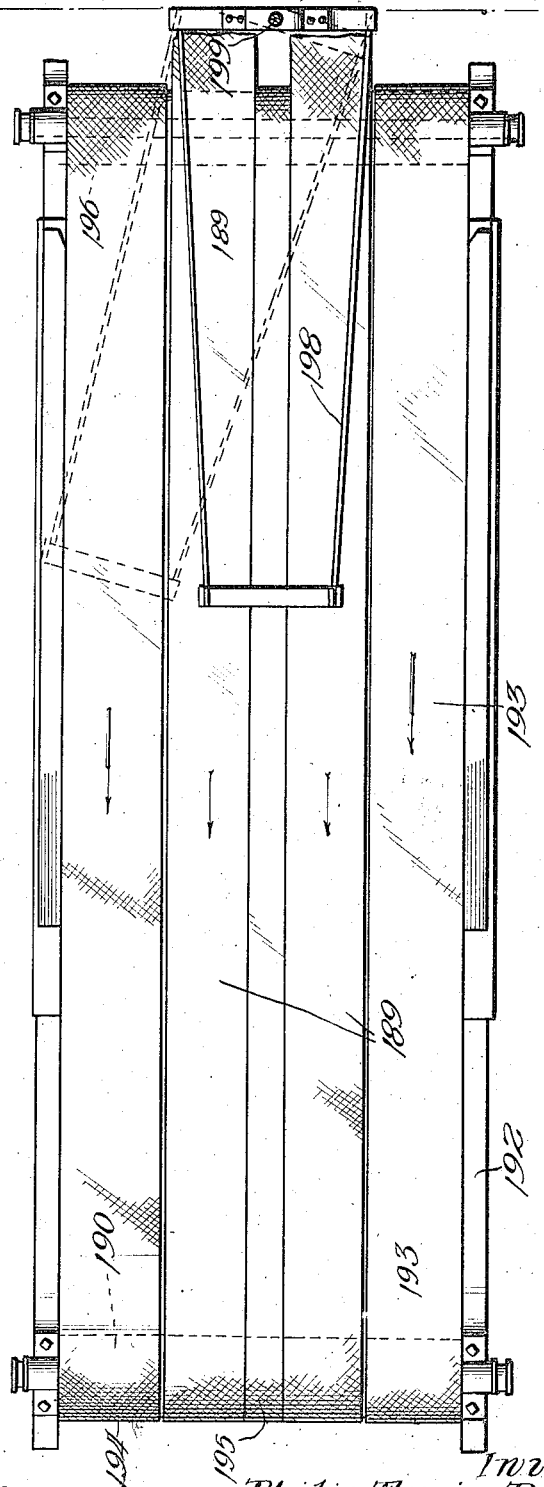

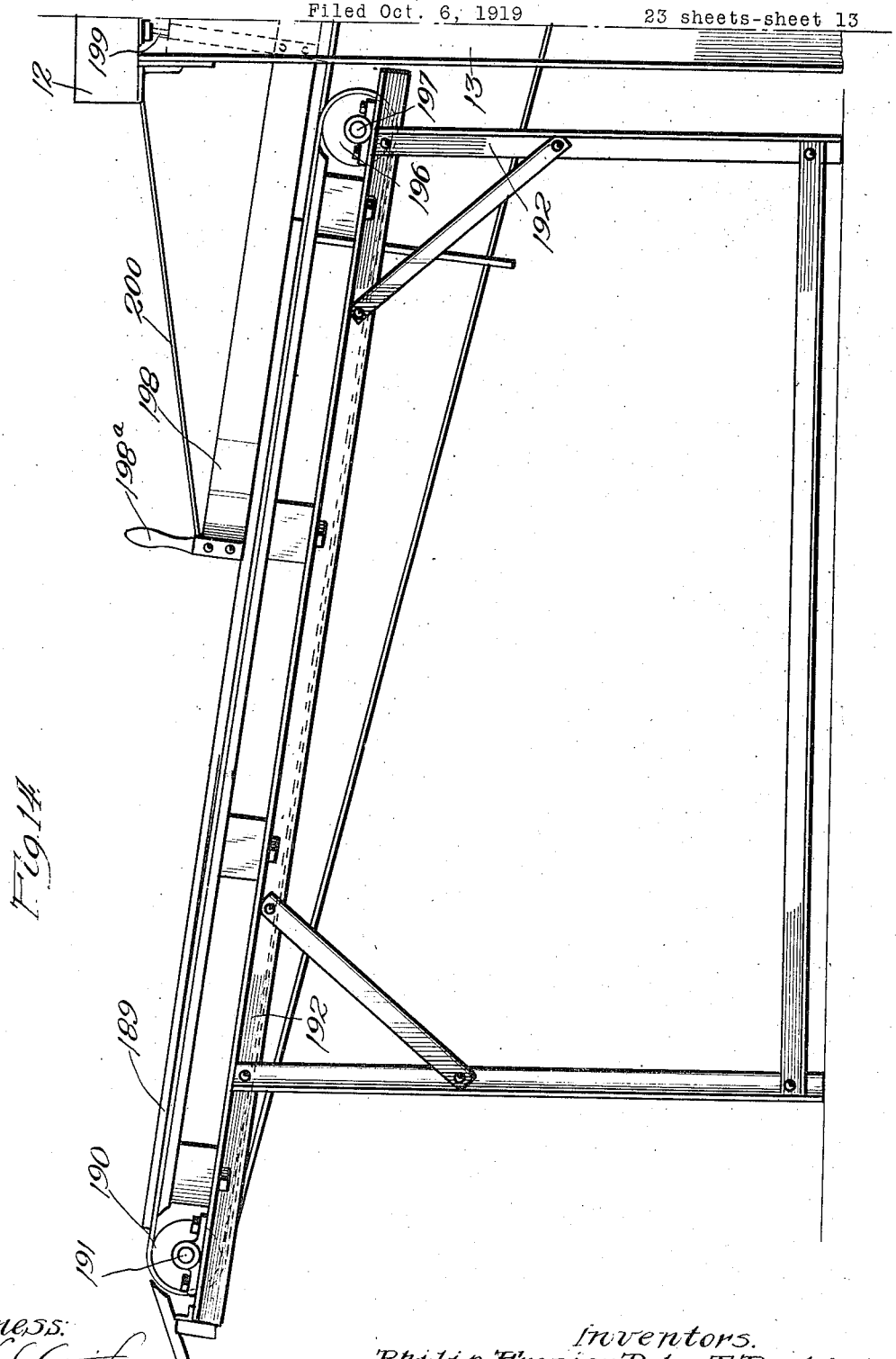

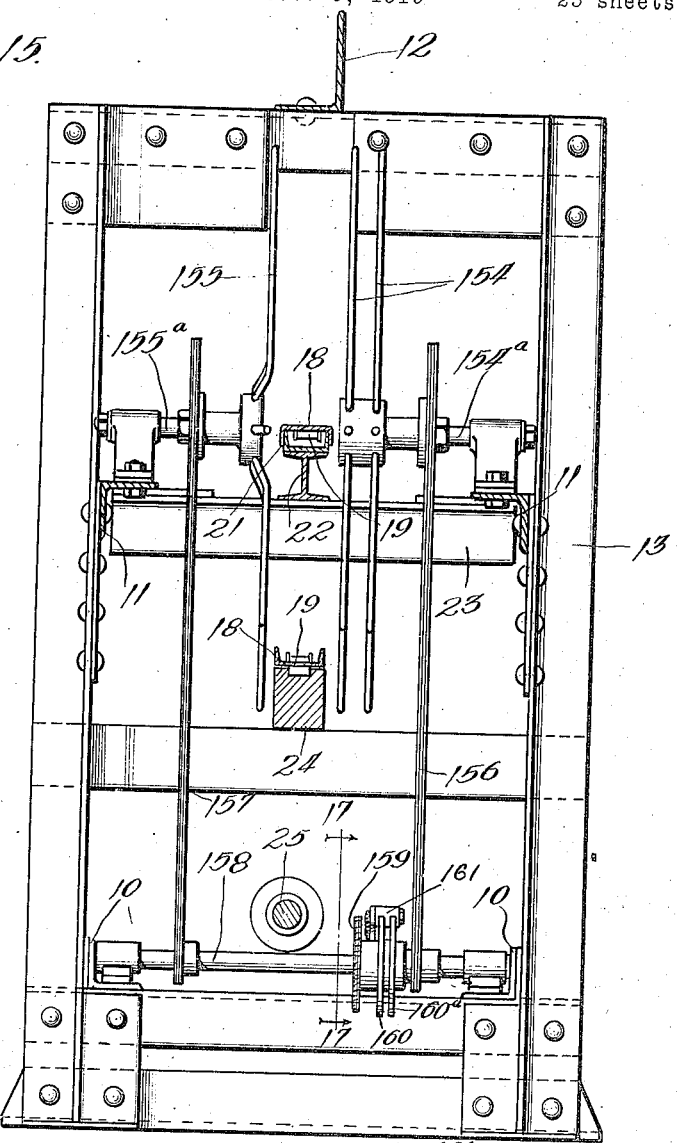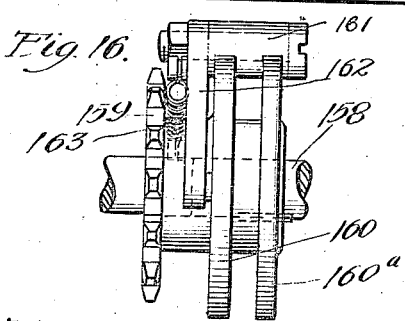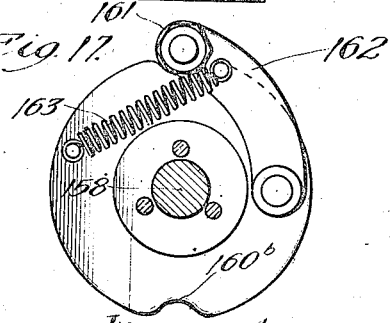

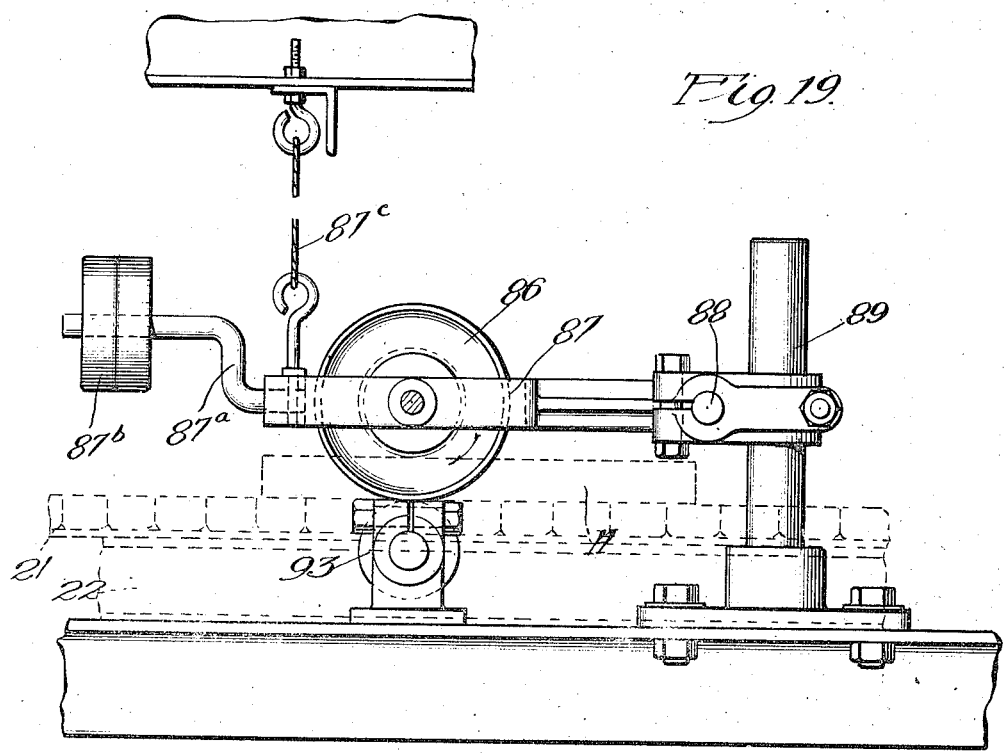
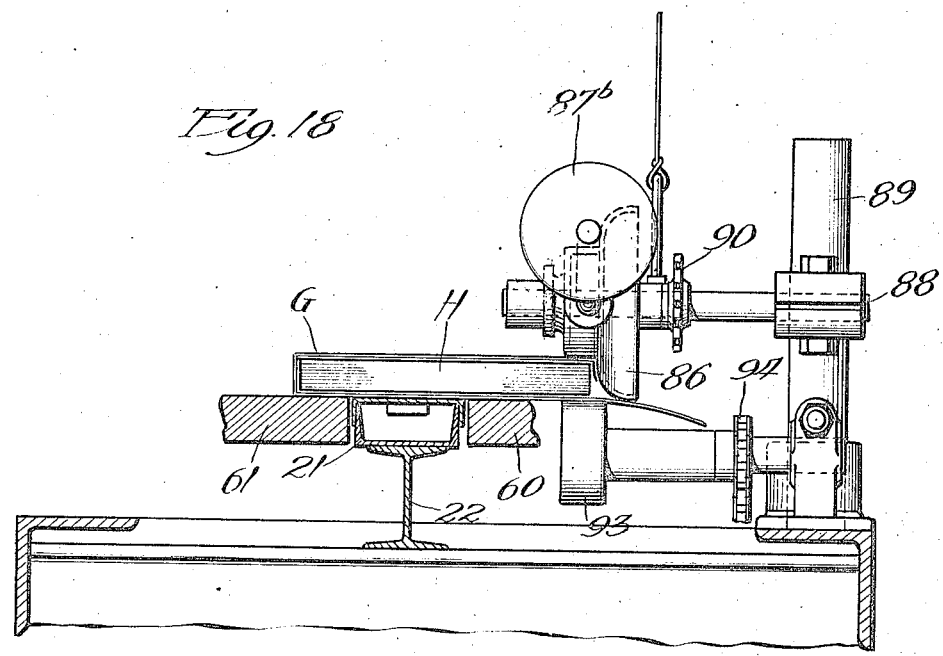

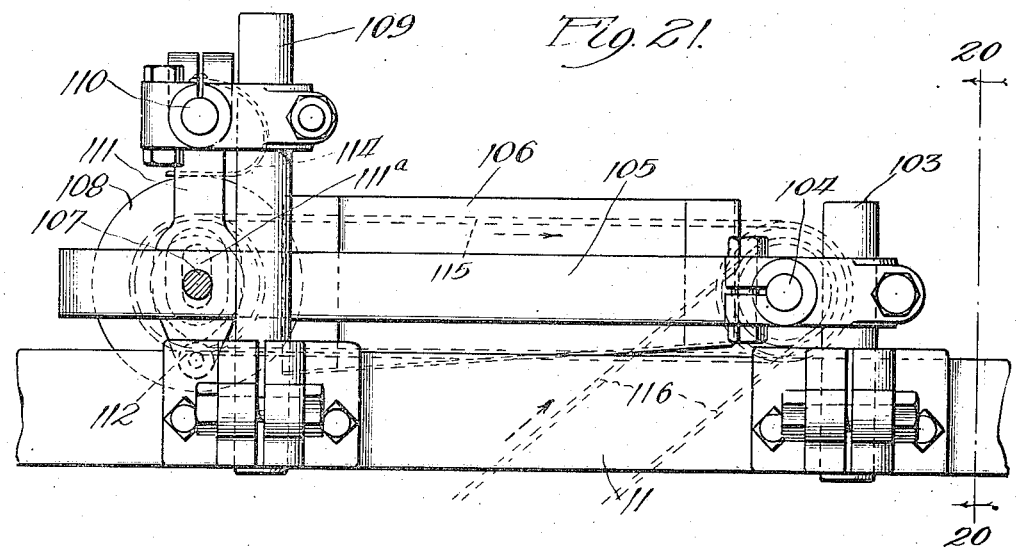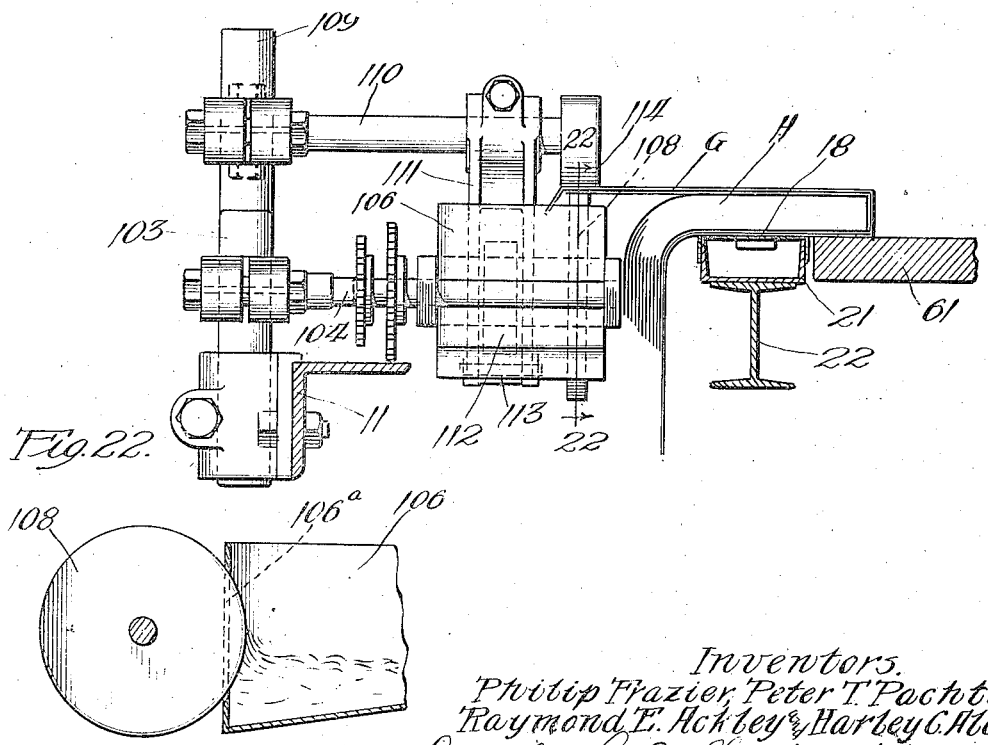

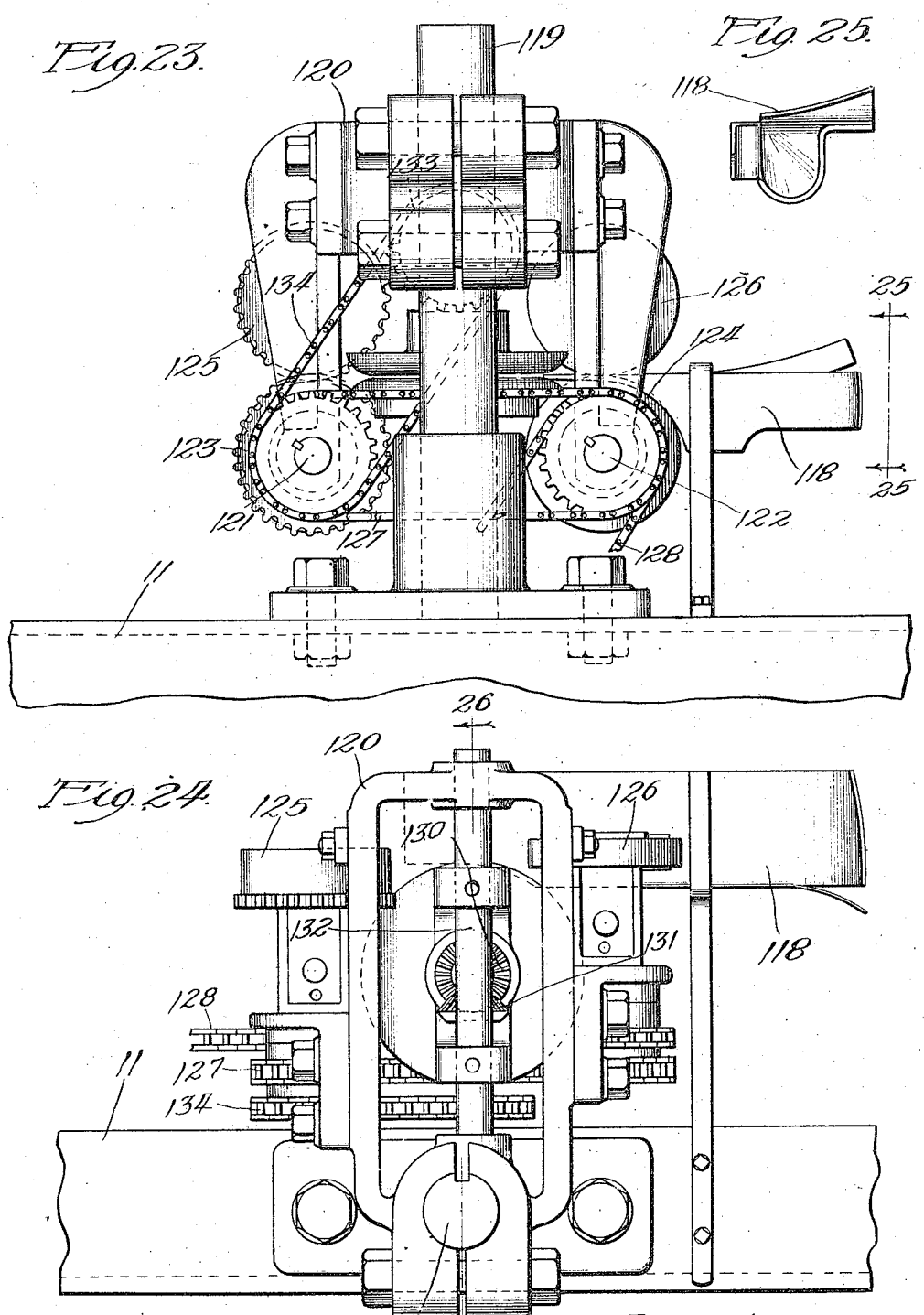

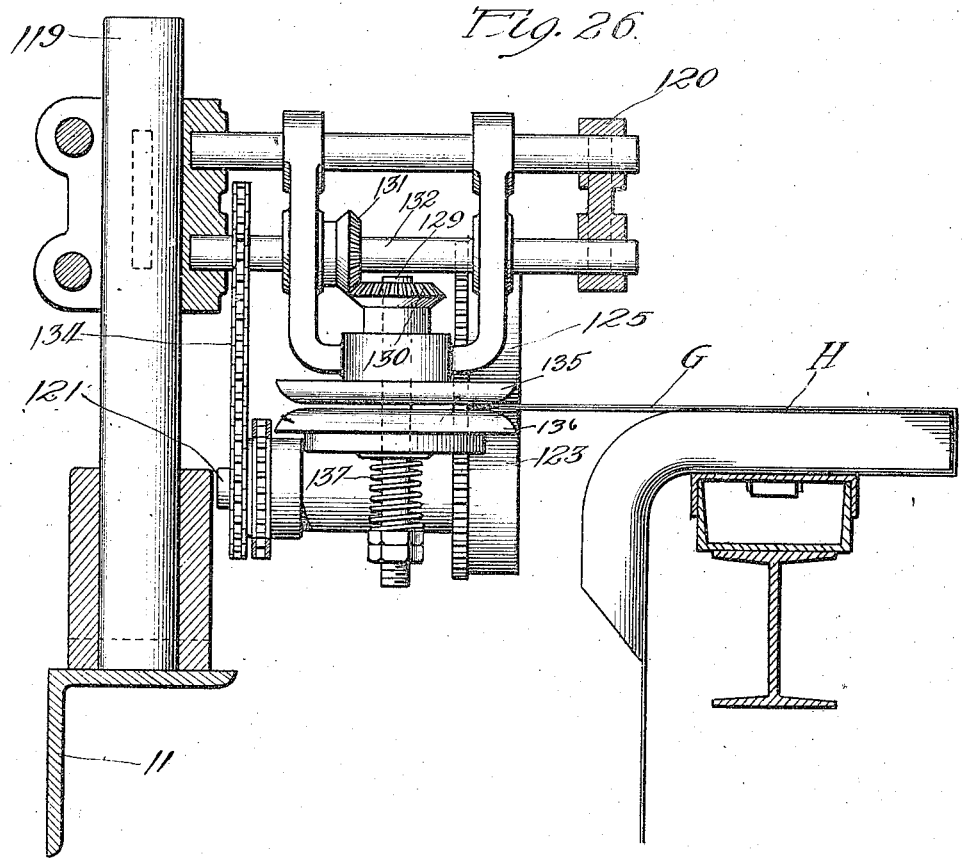

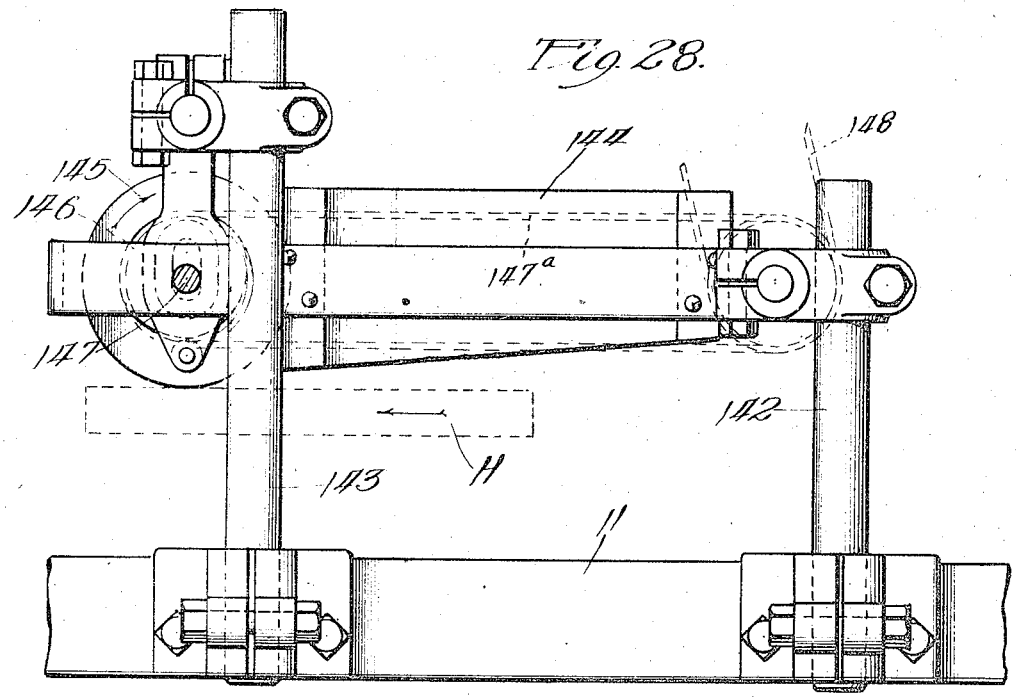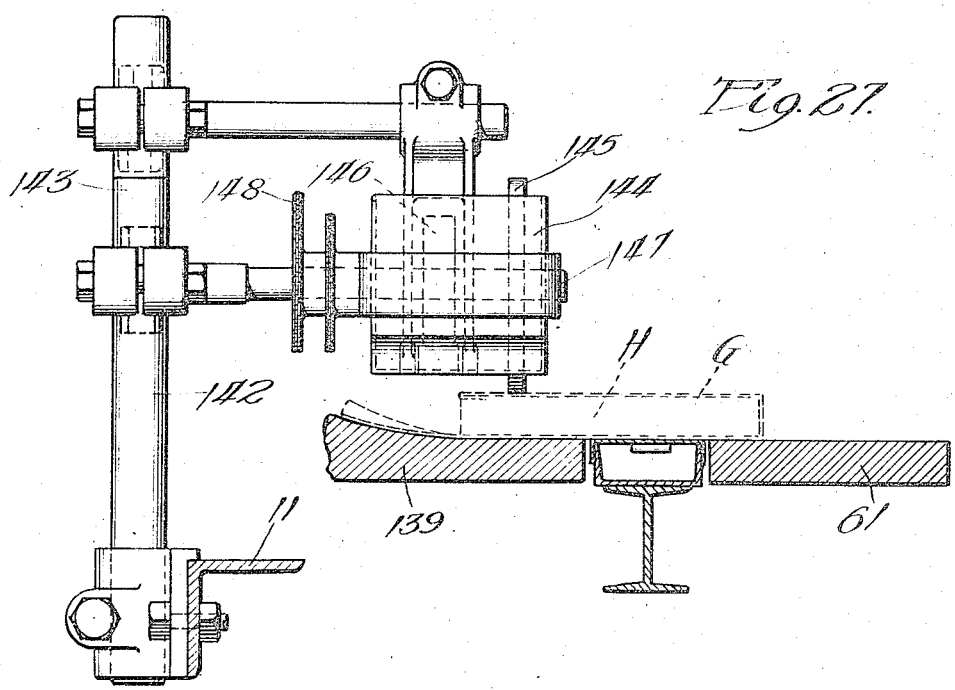

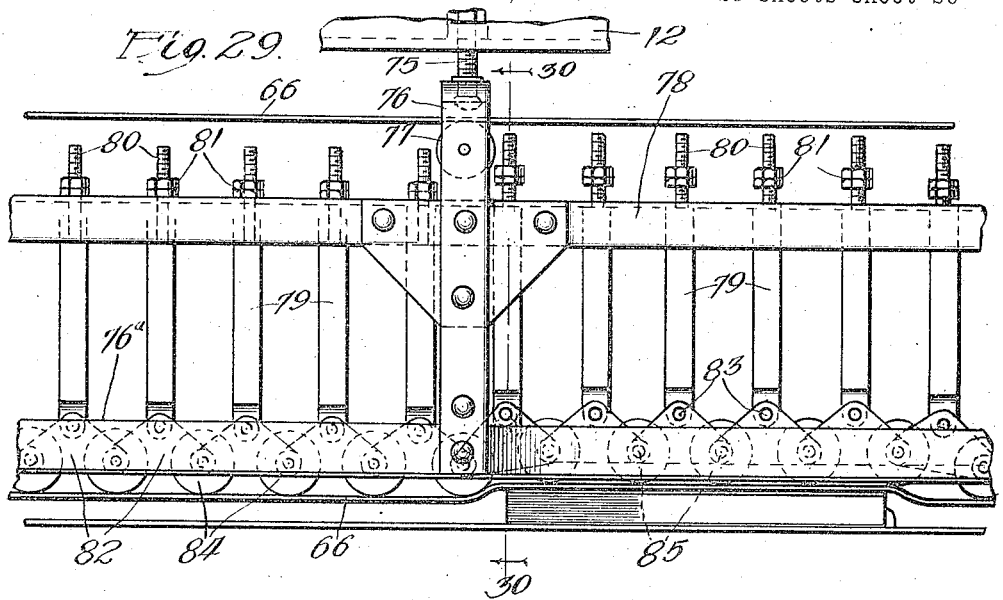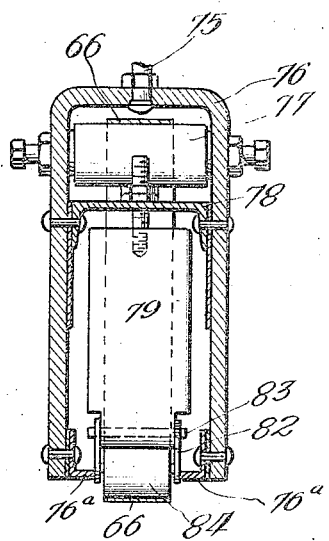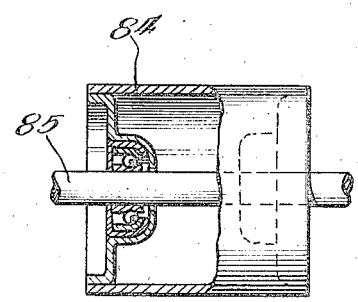

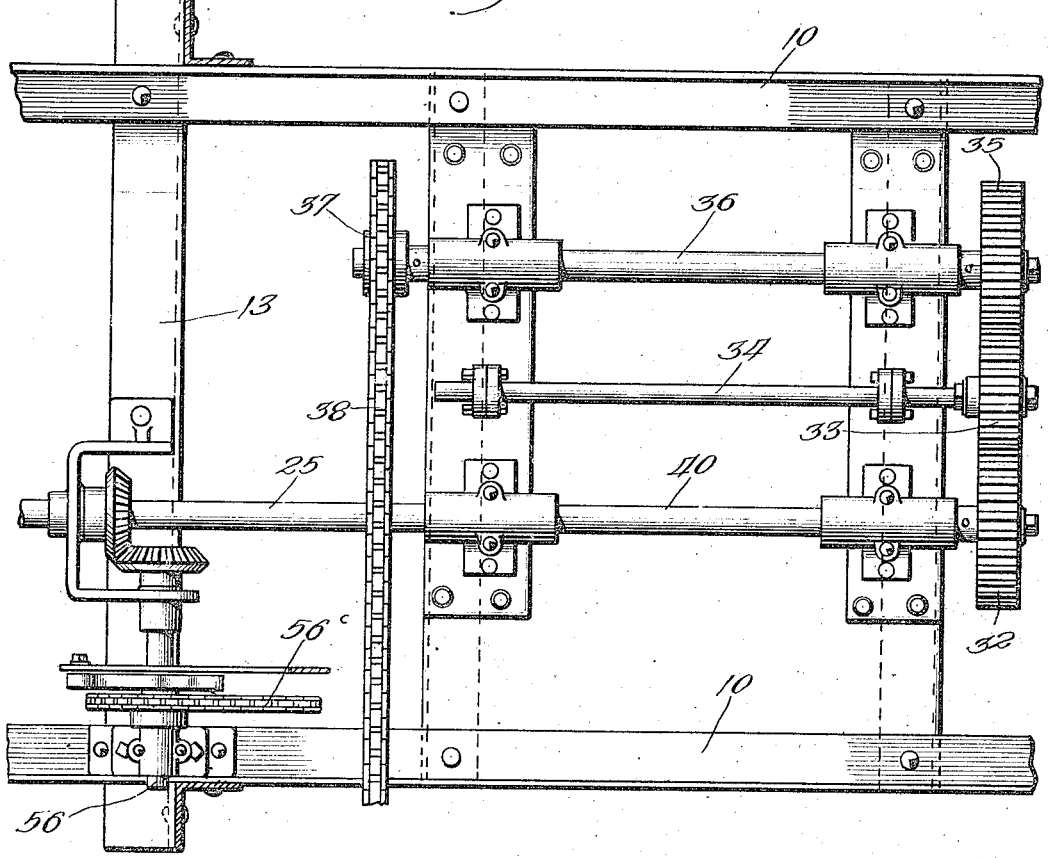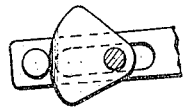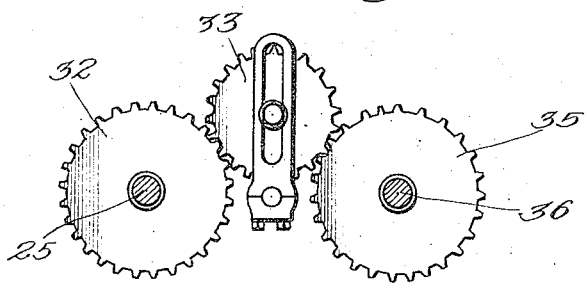

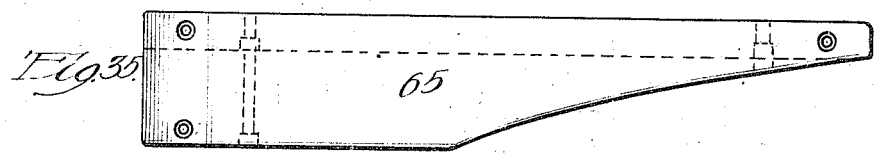
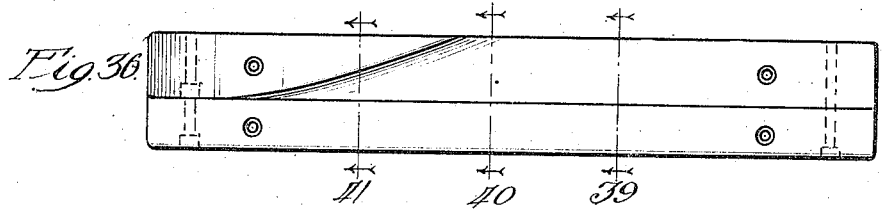
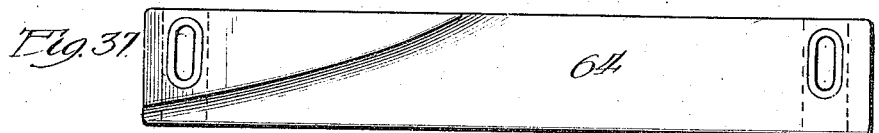
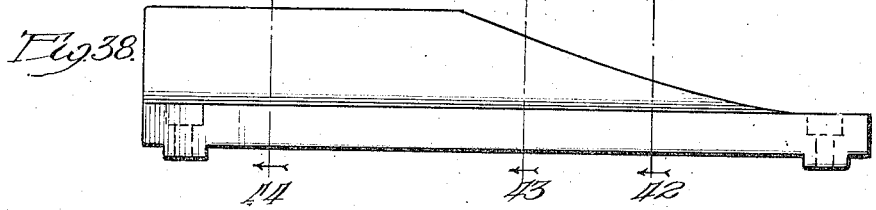
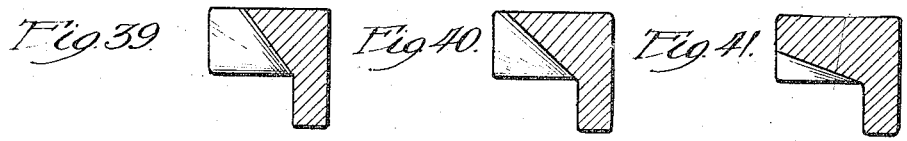
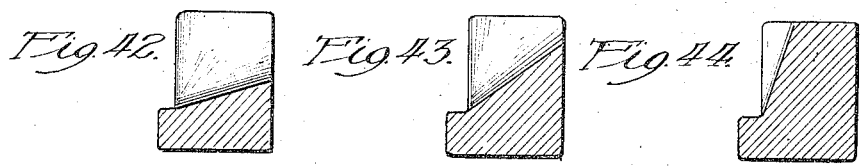
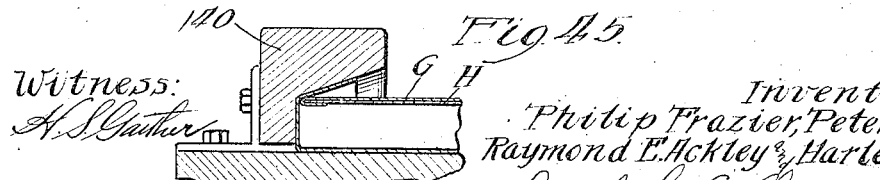

P. FRAZIER ET AL 1,446,171

BOOK WRAPPING MACHINE

Filed Oct. 6, 1919

Inventors.
Philip Frazier, Peter T. Pachter,
Raymond E. Ackley, Harley G. Alger.

Patented Feb. 20, 1923.

1,446,171

UNITED STATES PATENT OFFICE.

PHILIP FRAZIER, PETER T. PACHTER, RAYMOND E. ACKLEY, AND HARLEY C. ALGER, OF CHICAGO, ILLINOIS, ASSIGNORS TO R. R. DONNELLEY & SONS COMPANY, A CORPORATION OF ILLINOIS.

BOOK-WRAPPING MACHINE.

Application filed October 6, 1919. Serial No. 328,780.

*To all whom it may concern:*

Be it known that PHILIP FRAZIER, PETER T. PACHTER, RAYMOND E. ACKLEY, and HARLEY C. ALGER, citizens of the United States, residing at Chicago, in the county of Cook and State of Illinois, have invented a new and useful Improvement in Book-Wrapping Machines, of which the following is a specification.

Our invention relates to machines for wrapping books, catalogs, magazines, and the like and is fully described in the following specification and shown in the accompanying drawings, in which, Figures 1 and 2 respectively are diagrammatic plan view and front elevation of the complete wrapping machine, the letters A, B, C, D, E, and F, of Fig. 1 referring respectively to the enlarged plan views shown in Figs. 3, 5, 7, 9, 11 and 13, and in Fig. 2 to the corresponding side elevations shown in Figs. 4, 6, 8, 10, 12 and 14.

Fig. 15 is a vertical section on the line 15—15 of Fig. 12;

Figs. 16 and 17 are enlarged front view and section on the line 17—17 of Fig. 15;

Fig. 18 is an enlarged partial section on the line 18—18 of Fig. 7;

Fig. 19 is a front elevation of the same;

Fig. 20 is an enlarged partial section on the line 20—20 of Fig. 21;

Fig. 21 is a front elevation of the same;

Fig. 22 is a partial section on the line 22—22 of Fig. 20;

Figs. 23 and 24 are front elevation and plan view respectively of the squeezing rolls of Fig. 7;

Fig. 25 is an end elevation of the flare as viewed on the line 25—25 of Fig. 23;

Fig. 26 is a partial section on the line 26—26 of Fig. 24;

Fig. 27 is an enlarged partial section on the line 27 of Fig. 9;

Fig. 28 is a front elevation of the same;

Fig. 29 is an enlarged front elevation of the upper and lower conveyors and of the weights for gripping a book therebetween.

Fig. 30 is a section on the line 30—30 of Fig. 29;

Fig. 31 is an enlarged section of a roller;

Fig. 32 is a partial plan viewed on the line 32 of Fig. 6;

Fig. 33 is a detail of the cam and follower of Fig. 32;

Fig. 34 is an end elevation of the driving gears of Fig. 32;

Figs. 35 and 37 are plan views of the first flare as shown in Fig. 5;

Figs. 36 and 38 are side elevations of the same;

Figs. 39 to 44 are sections at various points on these flares;

Fig. 45 is a section through the last flare on the line 35 of Fig. 9 showing a book and wrapper in the final stage of wrapping;

Figure 46:
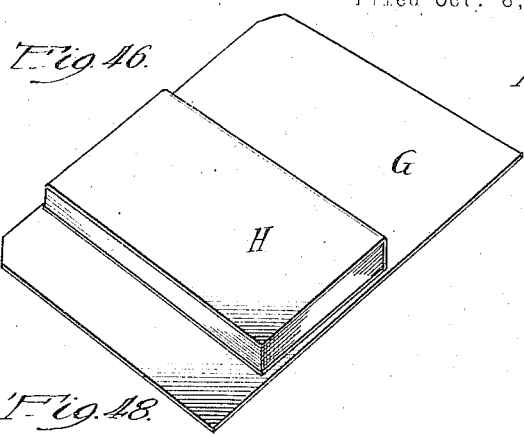
Figs. 46-51 are perspective views of a book and wrapper in successive stages of wrapping.

We have embodied our invention in a book wrapping machine which in a general way may be stated to consist of a long conveyor on which wrappers are fed one at a time and on each of these wrappers a book is accurately placed, so that the book and wrapper travel together with the conveyor through the machine where the wrapper is folded around the book, one end of the wrapper being tucked in under one edge of the book cover and glued down, the other end of the wrapper being brought around over the first mentioned end and glued thereto. Automatic means are also provided for feeding the wrappers and the books and these means are driven from the driving shaft of the wrapping machine and in synchronism with the operating parts thereof.

The main frame is made up of longitudinal angles 10, 11 and 12 as shown in Figs. 2 and 15 connected and supported by frames 13. Head and tail shafts 14 and 15 respectively are journaled in bearings mounted on this main frame and sprockets 16 and 17 are keyed on these shafts and form head and tail sprockets respectively of the long conveyor 18. A takeup 15$^a$ is provided on the tail shaft 15 for taking up slack in the conveyor which is made up of an endless chain 19 to each link of which is attached a bent plate 20 which forms the face of the conveyor. The upper or operative side of the conveyor as shown in Fig. 15 is slidably carried by an upturned channel 21 which is supported by an I beam 22 and this by cross pieces 23 of the frames 13. The lower side of the conveyor is slidable on the upper flanges of two channels 24 which set face to face and which are also carried by the frames 13, the conveyor lugs 18ª sliding between the flanges and serving to position it thereon.

This conveyor is driven from the main drive shaft 25 through bevel gears 26 and 27, the shaft 28, a sprocket 29 keyed thereon and a chain 30 to the sprocket 31 keyed on the head shaft 14 of the long conveyor. Other operative parts which are in synchronism with this conveyor are also driven from the main drive shaft 25 as will later be explained. This shaft is journaled in bearings carried by the frames 13, and as shown in Figs. 32 and 34 has keyed at its end a gear 32 which meshes with an idler 33 adjustably carried by an axle 34. The idler in turn meshes with a gear 35 which is keyed to a shaft 36 and this has a sprocket 37 keyed thereon and driven by a chain 38 from a sprocket 39 keyed on the clutch shaft 40 as shown in Fig. 6. This shaft is journaled in bearings 41 and has loosely journaled thereon a sprocket 42 which is operatively connected to a clutch element 43 slidably keyed on the shaft 40. The sprocket 42 is continuously driven from a source of power not shown. The purpose of the variable gears 32 and 35 is to provide a method of changing the gear ratio between the feeder and wrapping machine so that the wrapping machine will wrap books successively seriatim or at the same rate that they are fed by the feeder which may be in groups or piles of from one to ten books in a pile. The number to be handled in each pile is fixed by the given gear ratio. The clutch which may be of any convenient type may be connected or disconnected at will by means of a clutch operating lever 44 and a clutch rod 45 which is carried by the frames 13 and runs substantially the length of the wrapping machine so that it may be stopped from any point along its operating side.

The tail shaft 15 of the long conveyor also carries a sprocket 46 of the same size as the tail sprocket 17 of the long conveyor and which is driven thereby. The sprocket 46 drives a short chain conveyor 47, the forward end of which is carried over a sprocket 48 on the shaft 49, the latter being journaled in bearings carried by the main conveyor frame. This conveyor has a series of equally spaced lugs 47ª which are placed exactly opposite similarly spaced lugs 18ª on the long conveyor 18.

Any convenient form of wrapper feeding mechanism such as that shown in Figs. 3 and 4 may be used to feed wrappers to the two parallel conveyors just described. This is driven by means of sprockets and a chain 51 from the shaft 52 which in turn is driven by a sprocket 53 and a chain 54 from the sprocket 55 on the tail shaft 15 of the long conveyor. The shaft 52 also drives a series of parallel belt conveyors 56 which serve to deliver wrappers from the wrapper feeding mechanism to the chain conveyors 18 and 47.

The conveyor belts 56 are carried at their forward ends by pulleys 56ª on the shaft 56ᵇ which is driven by sprockets and the chain 56ᶜ from the shaft 56ᵈ. This shaft has a bevel gear meshing with a bevel gear on the drive shaft 25.

A series of horizontal guides 57 overlie these narrow belt conveyors and together with spring pressed rollers 57ª keep the wrapper flat and in contact with the conveyor.

A book station 58 to which books are fed as will later be explained has a bottom consisting of two plates 59 which are raised somewhat above the level of the long conveyor 18 so as to permit the wrappers D to pass beneath and are separated as shown in Fig. 5 to permit the lug 18ª of the long conveyor to pass therebetween.

It will therefore be understood from the foregoing description that the wrappers D will be sent forward one at a time by the narrow ribbon conveyor 56 until they have passed the forward rollers 57ª as shown in Fig. 6. The wrapper will then be picked up by the corresponding lugs 18ª and 47ª respectively of the long and short conveyors thereby moving the wrapper forward under the book station. At the same time the lug 18ª will engage the lower book 8 of the pile in the book station forcing it forward through an opening 58ª at its forward pass and dropping it off the bottom of the book station 59 and onto the wapper G' as shown in Fig. 5.

In order to keep the rear end of the pile of books from dropping before the front-end which has been found desirable to prevent distortion of the books we have provided a retaining means consisting of a bracket 58ᵇ carried by the angle 11 and having pivotally connected thereto a rocker arm having a finger 58ᶜ adapted to engage under the overhanging edge of the second book when the lower books are partly removed and to be withdrawn at the time the forward end of the second book drops.

Flat tables 60 and 61 as shown in Figs. 5 and 6 are mounted on each side of the long conveyor and are of substantially the same height so as to form supports for the outer ends of the book during the various wrapping operations. Right and left hand guides 62 and 63 respectively begin at the book stand 58 and extend forwardly and serve to hold the book in its proper position with respect to the conveyor and the wrapper.

A former or flare as we shall henceforth call it consisting of two elements 64 and 65 and shown in Figs. 5, 6 and 37 to 44 inclusive is placed on the right hand side of the conveyor. As the book and wrapper are advanced the right hand end of the wrapper is raised off the short chain conveyor 47 and accurately folded around the back of the book passing through the stages of the wrapper marked G', G², G³ and G⁴ of Fig. 5. In other words the book and wrapper enter this flare in the position shown in Fig. 46 and emerge from the flare in the position shown in Fig. 47, with the wrapper and cover of the book exactly parallel and covering the same three sides, namely, the bottom, the back and the top of the book.

Overlying the long conveyor 18 is a pressure belt 66 running over head and tail pulleys 67 and 68 respectively which are keyed to the head and tail shafts 69 and 70 which are journaled in bearing on the main frame. The sprocket 71 keyed to the head shaft is driven by a chain 72 from a sprocket 73 on the shaft 74 which is driven by a pair of beveled gears from the main shaft 25. The method of mounting and driving this shaft as well as a series of other shafts which will later be found to lie along the main shaft are journaled in bearing carried on the frame and driven in about the same way as shaft 28 in Fig. 12 which has previously been explained.

Figure 47:
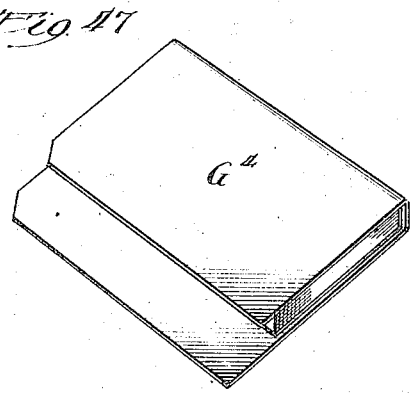

This pressure belt travels at exactly the same speed as the long chain conveyor 18, receives the book and wrappers after they have passed the first flare and when they are in the position G⁴ shown in Fig. 47. The pressure belt grips the book and wrapper to the main conveyor as will now be explained and does not release its hold thereon until after the wrapping operation is completed. The top angle 12 of the main frame has secured thereto preferably by means of threaded members or bolts 75 a series of inverted U-shaped members 76, shown in Figs. 10, 29 and 30. A roller 77 is rotatably mounted in the upper portion of each U-shaped member which is adapted to act as an idler for the upper strand of the pressure belt 66. A long horizontal channel member 78 facing downward is also secured between the sides of the U-shaped member. A series of weights 79 are adjustably carried by the channel 78 on threaded studs 80 which pass through holes spaced longitudinally of the channel, the studs being adjustably secured by lock nuts 81. These weights are pivotally secured to plates 82 by the pins 83. These plates in turn are pivotally connected to rollers 84 by pins 85.

Guide members 76ª are carried by the lower ends of the U-shaped members 76 and serve to position the rollers 84 on the pressure belt. The method of mounting these rollers permits them to rise and fall independently of each other as a book is carried along between the pressure belt and the long conveyor.

As long as there is nothing between the long conveyor and the pressure belt 66 the weights 79 will remain suspended by the studs 80 from the channel 78, as shown at the left hand side of Fig. 29. When, however, a book is passed along by the conveyor it will raise the weights as shown in the right hand side of Fig. 29 thereby firmly gripping the book and wrapper between the pressure belt and conveyor. Other forms of pressure means as springs may be used if desired.

A rotary creaser 86 is journaled in a frame 87 which is pivotally carried at 88 on a standard 89 secured to the main frame, as shown in Figs. 7, 8, 18 and 19. The creaser is driven through the sprocket 90 and the chain 91 from the sprocket 92 which is keyed to the tail shaft 70 of the belt conveyor.

Figure 48:
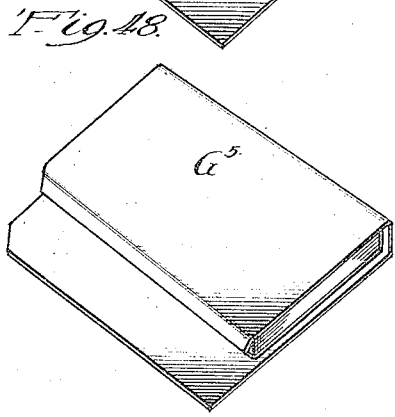

Each book and wrapper approaches the rotary creaser in the form shown by G⁴ in Fig. 47. The advancing book raises the rotary creaser thereby applying pressure to the upper left hand surface of the book and to the narrow overhanging portion of the wrapper as shown in Fig. 18 by the rotating member which engages the wrapper on two of its faces which lie at right angles to each other. As the cover emerges it has assumed the form G⁵ as shown in Fig. 48.

The weights 87ᵇ on an arm 87ª carried by the frame 87 apply the necessary pressure. The frame is supported by a cord 87ᶜ when the creaser is not resting on a book.

The pressure of the weighted creaser on the edge of the book has a tendency to cause the lower surface of the book to drag on the stationary support 60. In order to overcome this we have provided a supporting roller 93, the surface of which has the same velocity as the book. This roller is rotatably mounted on the main frame and carries a sprocket 94 which is driven by a sprocket 95 and a chain 96. The sprocket 95 is keyed to a shaft 97 and this is driven from the main shaft 25 by means of a pair of beveled gears.

It will be observed that the guide or table 60 which up to this time has afforded a support for the outer edge of the book, is cut away after passing the rotary creaser as shown in Fig. 8. A spring 98 carried by the main frame is also placed at this point so as to force down the overhanging edge of the book and wrapper. The upper part of the cover, together with the wrapper, will immediately spring back and maintain a nearly horizontal position, but the body of the book itself owing to its relative lack of stiffness will stay bent down and a cross section of the book and wrapper will then be substantially that shown in Fig. 20.

In order to make sure that none of the leaves of the book will remain up with the cover we have provided a detector 100 having fingers 101 and 102 which are far enough apart to permit the cover and wrapper to pass through, but which will be spread apart if any greater thickness than this attempts to pass. In that case the upper finger 101, strikes an electric contact 101ᵃ closing an electric circuit which may be utilized in any desired way to stop the wrapping machine thereby preventing any damage being done.

A pasting mechanism will now be described which places a spot of paste on the under side of the cover so that as the wrapper is folded around under the edge of the cover and pressed down it is pasted thereto. This is shown in Figs. 7, 8, 20, 21 and 22. A standard 103 carries a horizontal sub-axle 104 on which is journaled a U-shaped frame 105 carrying a paste tank 106 and a shaft 107 having a paste wheel 108 secured thereto and rotatable through at slot 108ᵃ in the end of the paste tank. Another standard 109 at the forward end of the paste tank has a transverse member 110 to which is secured a guide 111 having a substantially vertical slot 111ᵃ therein through which passes the shaft 107. This shaft has a cam 112 secured thereto and bearing on a roller 113 which is rotatably carried by the bottom part of the guides 111. The transverse member 110 also carries a leaf spring 114 which overlies the paste wheel 108.

It will be understood from the foregoing that as the shaft 107 revolves, the shaft itself, together with the paste wheel and pastetank, will alternately be raised and lowered due to the action of the cam. The height of the spring 114 above the paste wheel is such that when an article of a thickness of the wrapper and cover is passed through between the wheel and the spring the wheel will make contact with the under side thereof and place a spot of paste thereon. The shaft 107 is driven in synchronism with the long chain conveyor by means of suitable sprockets and the chains 115 and 116 from the horizontal shaft 117 which is driven by a pair of bevelled gears from the main drive shaft 25.

As the book is sent forward by the conveyor the leaves remain down while the upper part of the cover and the wrapper pass into a former 118 shown in Figs. 23, 24 and 25. This causes the overhanging creased edge of the wrapper to fold around and under the upper part of the cover and be brought into contact with the paste thereon.

A standard 119 as shown in Figs. 23, 24 and 26 is bolted to the horizontal angle 11 of the main frame, carries the frame 120 and in which the horizontal shafts 121 and 122 are journaled. To these shafts are keyed the rolls 123 and 124 respectively. The rolls have gear teeth formed on their edges which mesh with the gear teeth of the corresponding rolls 125 and 126. The folded wrapper and cover pass from the flare 118 through these two sets of rolls which are driven at the same speed as the book itself, by means of sprockets keyed thereto and chains 127 and 128 from a shaft 117 as shown in Fig. 10.

Figure 49:
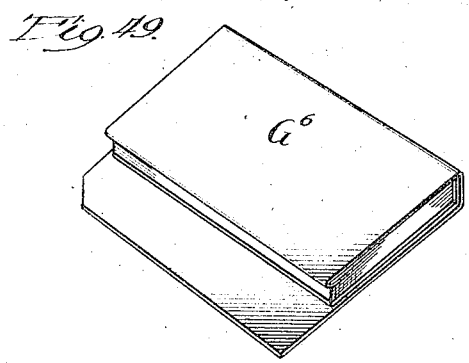

The frame 120 also has journaled therein a vertical shaft 129 to which is keyed a beveled gear 130 meshing with the bevel gear 131 journaled on a sub-axle 132 and having a sleeve to which is keyed a sprocket 133, the latter being driven by a chain 134 from a sprocket on a shaft 121. Two plates 135 and 136 having reversely flared edges are keyed to the shaft 129, the latter being slidable and pressed against the first by the spring 137. The edge of the wrapper as shown in Fig. 26 is carried between these plates so that it is firmly rolled down. The wrapper has now assumed the position $G^6$ of Fig. 49.

A flare consisting of three parts 138, 139 and 140 is secured to the main frame as shown in Figs. 9 and 10 and has its beginning at the left of the pressure roll in Fig. 8. This flare is quite similar to that shown in Figs. 37 and 44 inclusive except for the fact that the direction of the fold is reversed and this flare is a little longer for the reason that it picks the leaves up from the position shown in Fig. 26 wherein they are substantially vertical, and not from the horizontal position as is the case in the first flare. Fig. 45 shows a section of this flare performing the last folding operation.

Both these flares have smooth continuously curving faces over which the wrapper slides and both are provided with slots for the bolts which secure them so that they may be adjusted both vertically and laterally to accommodate books of different width and thickness.

A guide 141 overlies the flare section 138 and serves to confine the edge of the book between itself and the flare.

Figure 50:
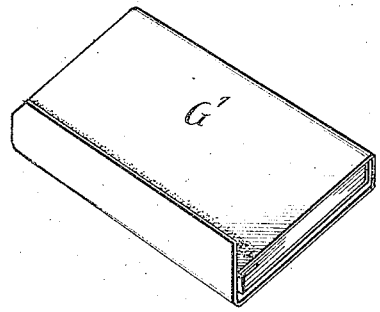

Standards 142 and 143 support a glue tank 144 and a gluing wheel 145 which are very similar in construction and operation to the paste wheel and tank previously described. In this case, however, as shown in Figs. 27 and 28 it is necessary to place a strip of glue the entire length of the wrapper and the cam 146 is shaped accordingly. The gluing wheel 145 is driven at the same speed as the book, by means of suitable sprockets over which run the chains 147ᵃ, 148 and 149 from the shaft 117 as shown in Fig. 10. On passing the gluing wheel the wrapper with the glue thereon will be substantially as shown in $G^7$ of Fig. 50.

While we have preferred in this embodiment of our invention to apply the paste to the upper surface of the wrapper, it is obvious that a similar result can be obtained by applying the paste to the inner surface of the lower end of the wrapper by any of several well-known pasting devices, before folding the lower end around the book.

The last operation as shown in cross section in Fig. 45 folds down the upper end of the wrapper and presses it upon the glue thereby completing the wrapping operation.

A counter 150 is placed at the end of the flare 140 for keeping an accurate count of the number of wrapped books passing through the machine.

A high speed conveyor 151 consisting of two belts placed one on each side of the long conveyor are carried by the main frame and driven from a jack-shaft 152 and this by a belt 153 running over a pulley on the shaft 74. When the books reach this conveyor they have passed out from underneath the pressure belt and are resting only by their own weight on the conveyor. The purpose of this belt conveyor is to move the books forward at a greater speed so as to disengage them from the lugs 18ª of the long conveyor and to deliver them to the reversing wheel 154 shown in Figs. 11, 12 and 15. Each lug 18ª has an over-jutting portion which engages the end of the book and overlies the lower portion of the wrapper (see Figs. 46-51). It will thus be seen that it is necessary to move the book forward faster than the conveyor in order to disengage it without tearing the lower portion of the wrapper.

This wheel consists of two sets of arms 154 and 155 which are placed on opposite sides of the chain conveyor 18. These are driven by the stub shafts 154ª and 155ª through the chains 156 and 157 respectively from the shaft 158, these stub shafts being journalled in bearings carried by the main frame. A sprocket 159 carrying a clutch element 160 is journaled on the shaft 158. A corresponding clutch element 160ª is keyed to the shaft 158, and these two elements are locked together by means of a roller 161 rotatably mounted upon an arm 162, the roller being held against notches 160ᵈ in the faces of the clutch element by a spring 163. The sprocket 159 is continuously driven by a chain 159ª from the shaft 174. If a book becomes caught in any way in either of the wheels 154 or 155 the spring 163 will permit the clutch element 160ª to stop thereby preventing any damage from being done.

Figure 51:
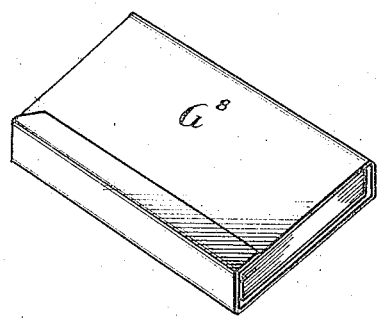

The turning wheel 154 receives the wrapped books in the form and position shown in Gˢ Fig. 51 with the back or reverse part of the wrapper uppermost. The book leaves the turning wheel reversed so that the face is uppermost and ready for the application of a label.

The wrapped books are again delivered to the long conveyor 18 by the turning wheel 154 so that each book is again in engagement with a lug 18ª. As the book is carried forward it passes under a gluing wheel 164, which together with the glue tank 165 is carried by the standards 166 and 167 secured to the main frame member 11. A detailed description of this gluing mechanism will be omitted for the reason that it is substantially the same as that previously described, and which was shown in Figs. 27 and 28. The glue wheel 164 is preferably made of a plurality of narrow disks running in narrow slots in the glue tank 165 and is driven by suitable sprockets and the chains 168 and 169 from the shaft 28. A series of narrow strips of glue is thus accurately placed on the top of the wrapper and mechanism for feeding a dry label to this patch of glue will now be described.

Brackets 170 secured to the main frame angle 11 carry a horizontal shaft 171 to which is secured an arm 172 pivotally connected to the end of a rod 173, the other end of which is slidably mounted on the shaft 28 and carries a roller 174 which is spring pressed to the face of a cam 175 on the shaft 28. The brackets 170 also have extensions 170ª carrying an axle 170ᵇ on which is pivotally connected a block 176 having a hole off set from and at right angles to the axis of its pivotal connection. Through this hole is slidable a rod 177 which is pivotally connected to an arm 178 which is keyed on the shaft 171. At the end of the rod 177 is a hollow stem 179 connecting with a suction plate 180. The hollow stem 179 is also connected by means of a tube 181 with a suction pump (not shown) or with any other suitable means for producing a partial vacuum.

A box 182 carried by the bracket 183 from the upper angle 12 of the main frame has an open top and an open side through the latter of which is inserted the suction plate 180 when in the full line position shown in Fig. 12. Lips are formed at the edges of the open side so as to retain the labels 184. These are pressed toward the opening by the follower plate 185 and the spring 186.

As the book advances therefore a spot of glue or paste is placed at a definite point thereon by the wheel 164, the book then traveling along with the conveyor lug 18ª of the long conveyor 18 under the labeling mechanism where a label is placed accurately on the spot of glue by the labeling mechanism which operates as follows:

The suction plate 180 is ordinarily in the full line position shown in Fig. 12 so that it is pressing against the end most label.

which is drawn strongly thereto by suction in the tube 171. At a definite point in the travel of the conveyor 18 the cam 175 on the shaft 28 acts upon the rod 173 pulling down the lever arms 172 and 178 thereby shifting the rod 177 from the horizontal full line position to the vertical dotted line position. The suction plate 180 traveling with the rod 177 draws out the endmost label and places it accurately on the glued spot on top of the wrapper of the book. As the book now passes along it passes under the pressure roller 187 carried by the arm 170ᵉ, forming a part of the bracket 170. The label is pressed down upon the glue by the suction plate with such force that it adheres firmly to the wrapper so that as the suction plate is withdrawn on the next upward movement, the label will be released therefrom. The roller 187 firmly presses the label down and completes the labeling operation.

The head shaft 14 of the long chain conveyor has keyed thereon pulleys 188 over which run the belt conveyors 189. These pulleys are of somewhat larger diameter than the sprocket wheels 16 of the conveyor so as to cause the belt conveyor 189 to travel faster than the chain conveyor, thereby again disengaging the books and wrappers from the lugs 18ᵃ. The forward end of the belt conveyor 189 passes over the long idler pulley or roller 190 carried on the shaft 191 which is journaled in bearings secured to the frame 192. This pulley also carries the belt conveyors 193 and 194 which are placed one on each side of the belt conveyor 189, and the narrow belt conveyor 195 which lies between the conveyors 189 and fills the space left open by the long chain conveyor. The conveyors 193, 194 and 195 are of substantially the same length, and at the opposite end pass over a roller 196 which is carried on a shaft 197, the latter being journaled in bearings carried on the frame 192.

A chute consisting of sides 198 is pivotally mounted at 199 on the main frame so as to be movable over the conveyors 193 and 194. A guy rod 200 pivoted on the main frame also assists in supporting the chute so that its weight will not rest upon the conveyor. A convenient means for moving this chute, such as a handle 198ᵃ is supplied so that books coming from the long conveyor can be shifted to one side or the other on the conveyors 193 and 194 so as to deliver the books from these conveyors in bag lots.

In order to do this the labels 184 are made up and arranged with this in view. In some large catalogs for instance, ten catalogs constitute an ordinary bag lot. The labels are then arranged so that one bag will contain say ten catalogs going to the same post office and the tenth label will have attached thereto a bag tag giving the name of the post office to which the bag is to be sent. As the catalogs pass the chute they will be directed to a discharge apron which we have illustrated as one of the side conveyors 193 or 194 until the bag tag appears, indicating that that is the last catalog to go into that bag. As soon therefore as that catalog has passed the operator will immediately shift the chute so as to direct the next catalog and others following to the opposite conveyor for the next bag lot, which will be completed as in the preceding case by the appearance of a catalog bearing the bag tag. The ten catalogs are then placed in the bag and secured with the usual cord fastener and the bag tag placed in the label holder which forms a part of the fastener.

It will be understood, however, that the bag tag may be placed on the first catalog or package of each bag lot if desired, and the shift will then take place just ahead of the bag tag.

While the conveyers 193 and 194 are shown for illustration purposes and are preferred, it is to be understood that any other form of discharge apron such as a sloping chute or other similar means may be employed to convey the books from the end of the long conveyer to the point where they are sorted.

The books to be wrapped are supplied in piles preferably of three to a feeding mechanism 201, as shown in Fig. 1. The number in each pile may, however, be changed so as to have more or less than three books by making the corresponding changes in the geared drive of the feeding mechanism shown in Fig. 32 so that the books are fed seriatim and at the same rate to the wrappers. This mechanism automatically feeds these piles to the row trimmer 201 which trims the top, bottom and one side and delivers these piles of three to the cross-conveyor 203 and that to a feeding mechanism 204 which is similar to the feeding mechanism 201. This feeds the books, a pile at a time, to the book station 58.

The trimmer and feeding mechanism just described are driven from the shaft 25 by means of chains and sprockets or similar mechanism whereby the books are fed to the wrapping machine in synchronism with the long chain conveyor 18 and with the parts which operate therewith.

It will therefore be understood that after the books are fed to the trimmer and wrappers to the wrapper feeding mechanism that the operation of supplying a book on a wrapper wrapping the wrapper about the book and gluing it thereon, gluing a label on the book and then sorting the books according to the labels, is completely automatic with exception of the hand operation necessary to shift the chute in order to sort the books into bag lots.

While we have shown and described but a single embodiment of our invention, numerous modifications are possible. Changes therefore in the construction and arrangement may be made without departing from the spirit and scope of our invention as disclosed in the appended claims.

What we claim as new, and desire to secure by Letters Patent is:

1. In a book wrapping machine, means for feeding the wrappers one at a time, means for feeding a book on each wrapper, folders in the path of the book and wrapper, means for moving the book and wrapper along said path and against said folders, means for folding one end of said wrapper over and around the edge of the cover of said book and into engagement therewith, means for folding the opposite end of said wrapper around the first mentioned end and means for applying adhesive to said wrapper to hold it in said position.

2. In a book wrapping machine, means for feeding the wrappers one at a time and means for feeding a book on each wrapper, folders in the path of the book and wrapper, means for moving the book and wrapper along said path and against said folders, means for applying adhesive to the under portion of the cover, means for folding one end of said wrapper over the edge of the cover of said book, means for pressing it against said adhesive, means for folding the opposite end of said wrapper around the first-mentioned end and means for applying adhesive to said wrapper to hold it in said position.

3. In a book wrapping machine, means for feeding the wrappers one at a time and means for feeding a book on each wrapper, folders in the path of the book and wrapper, a conveyer for moving the book and wrapper along said path and against said folders, means above said book and conveyer adapted to force said book into contact with said conveyer, means for folding one end of said wrapper over and around the edge of the cover of said book and into engagement therewith, means for folding the opposite end of said wrapper around the first-mentioned end and means for applying adhesive to said wrapper to hold it in said position.

4. In a book wrapping machine, means for feeding the wrappers one at a time and means for feeding a book on each wrapper, folders in the path of the book and wrapper, a conveyer for moving the book and wrapper along said path and against said folders, means above said book and conveyer adapted to travel with said book and to force said book into contact with said conveyer, means for folding one end of said wrapper over and around the edge of the cover of said book and into engagement therewith, means for folding the opposite end of said wrapper around the first-mentioned end and means for applying adhesive to said wrapper to hold it in said position.

5. In a book wrapping machine, lower and upper conveyers adapted to receive and grip in a horizontal position a partially wrapped book having flexible leaves and a relatively stiff cover, said wrapper covering the same three sides as the cover and overhanging at its ends, the open side of the book and cover overhanging the conveyers so as to cause the leaves to drop away from the upper cover, and means in the path of said wrapper for folding the upper end of the wrapper around and under the upper stiff overhanging edge of the cover.

6. In a book wrapping machine, lower and upper conveyers adapted to receive and grip in a horizontal position a partially wrapped book having flexible leaves and a relatively stiff cover, said wrapper covering the same three sides as the cover and overhanging at its ends, the book and cover overhanging the conveyers so as to cause the leaves to drop away from the upper cover, and means for folding the upper end of the wrapper around and under the upper stiff overhanging edge of the cover, a paste wheel for applying paste to the underside of the overhanging stiff cover and means for pressing the overhanging edge of the wrapper into contact with said pasted portion, said means lying in the path of said wrapper.

7. In a book wrapping machine, lower and upper conveyers adapted to receive and grip in a horizontal position a partially wrapped book having flexible leaves and a relatively stiff cover, said wrapper covering the same three sides as the cover and overhanging at its ends, the book and cover overhanging the conveyers so as to cause the leaves to drop away from the upper cover, means in the path of said wrapper for folding the upper end of the wrapper around and under the upper stiff overhanging edge of the cover, a paste wheel for applying paste to the upper side of the wrapper, means for folding the lower end of the wrapper around the package and means for pressing it down on said pasted portion, said paste wheel and the several means lying in the path of said wrapper.

8. A machine for handling packages comprising a conveyer adapted to carry a package, a conveyer parallel to said first conveyer and in spaced relation thereto, said conveyers being adapted to move in the same direction and at the same rate and means for applying pressure to one of said conveyers to grip a package placed therebetween, lugs on the first-mentioned conveyer for engaging the packages and another conveyer at the delivery end of the first-mentioned conveyer for accelerating the packages to disengage them from said lug.

9. In a book wrapping machine, means for holding a partially wrapped book having flexible leaves and a relatively stiff cover, said means permitting the leaves to drop away from the upper cover and means for folding the upper end of the wrapper around and under the edge of the upper cover.

10. In a book wrapping machine, lower and upper conveyers adapted to receive and grip in a horizontal position a partially wrapped book having flexible leaves and a relatively stiff cover, said wrapper covering the same three sides as the cover and overhanging at its ends, the book and cover overhanging the conveyers so as to cause the leaves to drop away from the upper cover, means for applying paste to the underside of the cover, and means for folding the upper end of the wrapper around and under the upper cover, means for pressing it down on said pasted portion, means for folding the lower end of the wrapper around the book and over the folded end of the wrapper, means for applying paste to one of the facing portions of the wrapper and means for pressing down the overlapping end.

11. In a book wrapping machine, means adapted to receive and grip in a horizontal position a partially wrapped book having flexible leaves and a relatively stiff cover, said wrapper covering the same three sides as the cover and overhanging at its ends, the book and cover overhanging the conveyers so as to cause the leaves to drop away from the upper cover, means for applying paste to the underside of the cover, means for folding the upper end of the wrapper around and under the upper cover, means for pressing it down on said pasted portion, means for folding the lower end of the wrapper around the book and over the folded end of the wrapper, means for applying paste to one of the facing portions of the wrapper and means for pressing down the overlapping end.

12. In a conveyer for handling partially wrapped books, a series of undercut lugs fixedly secured to said conveyer adapted to engage an edge of said books and to overlie the edge of said wrapper, and means for producing relative movement between the lug and wrapped book whereby the book is disengaged from the lug.

13. In a conveyer for handling partially wrapped books, a series of undercut lugs fixedly secured to said conveyer adapted to engage an edge of said books and to overlie the edge of said wrapper, and means for disengaging said lug from the book.

14. In a book wrapping machine, mechanism adapted to hold a book and a wrapper, said wrapper overhanging the edge of the book, said edge being formed of two surfaces, substantially at right angles to each other, said mechanism moving the book parallel to said edge, and a rotary creaser in the path of said book rotatable about a horizontal axis and having a cylindrical portion and a flange forming an annular notch adapted to crease the wrapper about said edge.

15. In a book wrapping machine, mechanism adapted to hold a book and a wrapper, said wrapper overhanging the edge of the book, said edge being formed of two surfaces, substantially at right angles to each other, said mechanism moving the book parallel to said edge, and a rotary creaser in the path of said book having a flange for creasing the wrapper about said edge, supported from beneath by a table, said creaser having a substantially cylindrical portion adapted to overlie the top of said book and wrapper, and an adjoining portion extending radially and curved away from said cylindrical portion.

16. In a conveyer for handling partially wrapped books, a series of undercut lugs on said conveyer adapted to engage an edge of said books and to overlie the edge of said wrapper, and another conveyer at the delivery end of said conveyer for accelerating said books to disengage them from the lugs.

PHILIP FRAZIER.
PETER T. PACHTER.
RAYMOND E. ACKLEY.
HARLEY C. ALGER.